(12) United States Patent  
Poynter

(10) Patent No.: US 7,453,442 B1  
(45) Date of Patent: Nov. 18, 2008

(54) RECONFIGURABLE USER INTERFACE SYSTEMS

(75) Inventor: William Douglas Poynter, Duluth, GA (US)

(73) Assignee: NCR Corporation, Dayton, OH (US)

( * ) Notice: Subject to any disclaimer, the term of this patent is extended or adjusted under 35 U.S.C. 154(b) by 823 days.

(21) Appl. No.: 10/308,555

(22) Filed: Dec. 3, 2002

(51) Int. Cl.
*G06F 3/041* (2006.01)

(52) U.S. Cl. ...................................... 345/173; 345/168

(58) Field of Classification Search ................. 345/156, 345/172–178, 168, 169; 178/18.01–18.11; 400/472, 489
See application file for complete search history.

(56) References Cited

U.S. PATENT DOCUMENTS

| | | | | |
|---|---|---|---|---|
| 5,909,211 A | * | 6/1999 | Combs et al. ................ | 345/172 |
| 5,920,312 A | | 7/1999 | Wagner et al. | |
| 6,002,395 A | | 12/1999 | Wagner et al. | |
| 6,073,036 A | * | 6/2000 | Heikkinen et al. ........ | 455/550.1 |
| 6,095,410 A | * | 8/2000 | Andersen et al. ............ | 235/380 |
| 6,225,982 B1 | * | 5/2001 | Vassigh et al. .............. | 345/173 |
| 6,411,286 B2 | | 6/2002 | Vassigh et al. | |
| 6,492,978 B1 | * | 12/2002 | Selig et al. .................. | 345/173 |
| 2003/0197687 A1 | * | 10/2003 | Shetter ........................ | 345/173 |
| 2003/0235452 A1 | * | 12/2003 | Kraus et al. ................. | 400/472 |
| 2004/0038721 A1 | * | 2/2004 | Wells .......................... | 463/16 |
| 2005/0012723 A1 | * | 1/2005 | Pallakoff .................... | 345/173 |
| 2005/0024341 A1 | * | 2/2005 | Gillespie et al. ............ | 345/173 |
| 2005/0179565 A1 | * | 8/2005 | Mase et al. .................. | 341/21 |

FOREIGN PATENT DOCUMENTS

GB  2313343  * 11/1997

* cited by examiner

*Primary Examiner*—Ricardo L Osorio  
(74) *Attorney, Agent, or Firm*—Priest & Goldstein, PLLC; Paul W. Martin

(57) ABSTRACT

User interface systems comprising a touch screen actuator and a tactile key, in which the tactile key is placed adjacent to the touch screen actuator so that manipulation of the tactile key can be detected by the touch screen actuator. Tactile key modules that can be so placed adjacent to a touch screen actuator, and methods of producing such user interface systems, as well as, repositioning such tactile key modules, are also described.

15 Claims, 32 Drawing Sheets

Payment — 45

Select customer payment type.

Pay Amt $:

Cash — 44
Personal Checks
Smart Card
Credit Card
Foodstamp ($0.00)
Gift Certificate
Traveller's Check
Other Payments Subtotal: $114.33
6% Sales Tax: $6.86
Balance Due: $121.19

[📊] Item Menu

Scan, key in, or modify item.

PLU: 20185

Transaction # 1

| | |
|---|---|
| Garcia 500 Reel | $24.95 |
| Berkley Trilene 6# | $6.95 |
| Garcia UltraLite Pole | $19.95 |
| Rapala Sinking Lure | $1.95 |

| | |
|---|---|
| Subtotal: | $56.80 |
| 6% Sales Tax: | $3.41 |
| Balance Due: | $60.21 |

- # Change Quantity
- ↻ Item Repeat
- ✕ Item Void
- 🏷 Change Price
- % Percent Discount
- $ Dollar Discount
- Change Tax
- ? Item Inquiry

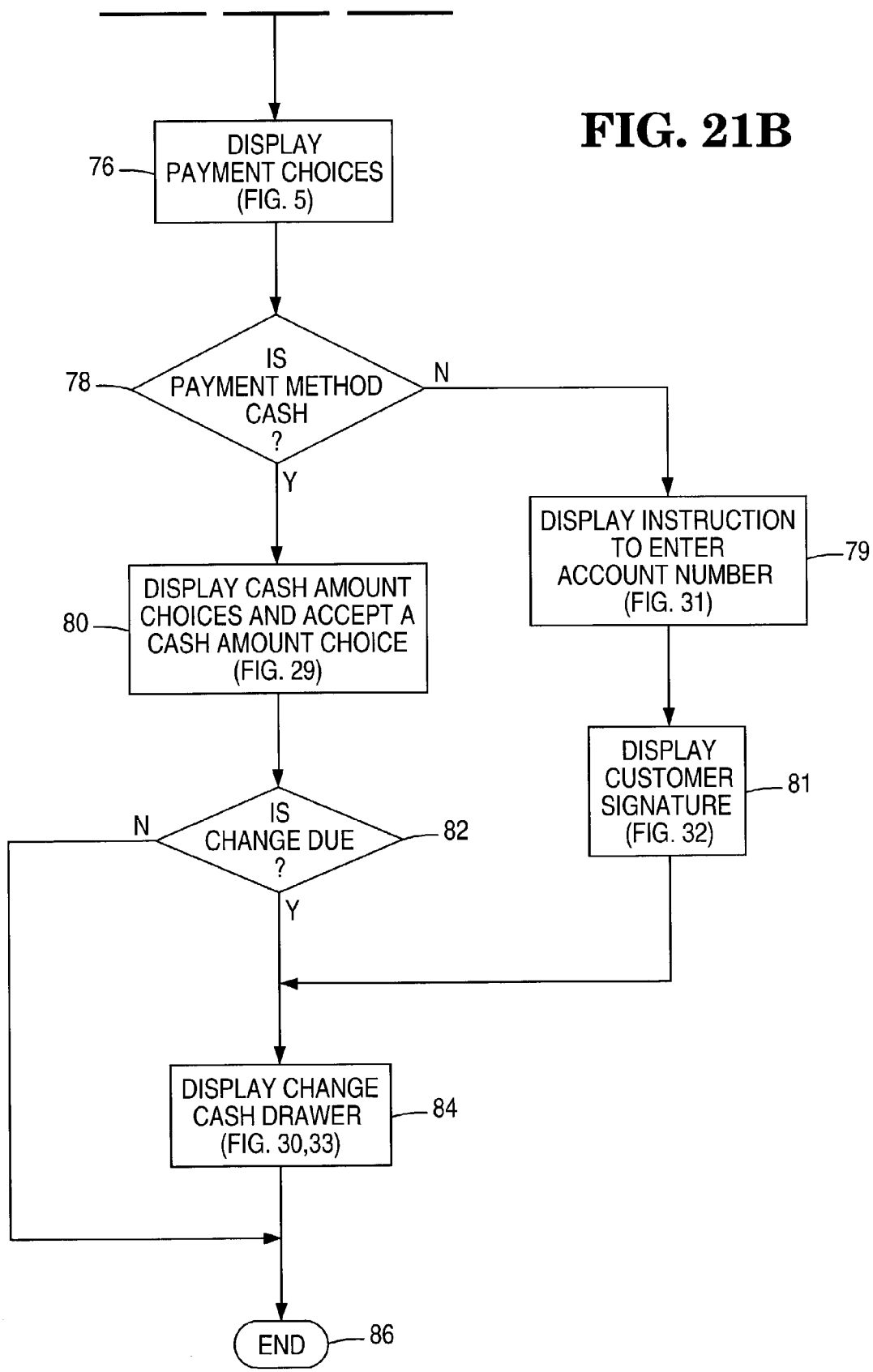

Item Menu

Scan, key in, or modify item.

Entry 1 of 1

| | |
|---|---|
| 1 Notepads<br>3 / $1.00 | $0.39 |

| | |
|---|---|
| Subtotal: | $0.39 |
| 6% Sales Tax: | $0.02 |
| Balance Due: | $0.41 |

- # Change Quantity
- ↻ Item Repeat
- ✕ Item Void
- 🏷 Change Price
- % Percent Discount
- $ Dollar Discount
- %° Change Tax
- ? Item Inquiry

Item Menu

Scan, key in, or modify item.

Entry 2 of 2

1 Notepads  
   3 / $1.00                            $0.39

5 501 Blue Jeans                       $94.95

Subtotal:                              $95.34
6% Sales Tax:                           $5.72
Balance Due:                      $101.06

Change Quantity  #

Item Repeat  ↻

Item Void  ✗

Change Price  🏷$

Percent Discount  %

Dollar Discount  $

Change Tax  %

Item Inquiry  ?

Change Quantity

Highlight item on receipt, then select or key in new quantity.

Quantity:

Entry 2 of 2

1 Notepads
3 / $1.00     $0.39

5 501 Blue Jeans     $94.95

Cash

Select or key in cash amount.

Cash Amt $:

Subtotal: $114.33
6% Sales Tax: $6.86
Balance Due: $121.19

RECONFIGURABLE USER INTERFACE SYSTEMS

FIELD OF THE INVENTION

The present invention relates to improvements in the field of touch screen user interface systems. In particular, the present invention relates to reconfigurable touch screen systems augmented by dynamic or static tactile keys that provide signaling action, detectable by touch screen actuators, with improved accuracy and ease of use.

BACKGROUND OF THE INVENTION

Traditional user interface hardware systems such as tactile keyboards typically are actuated by applying pressure to a selected key, which then causes the actuation of further components within the keypad or keyboard. The key to which such pressure is applied generally is a discrete hardware element, and the key can readily be designed to require the application of a pressure exceeding a threshold level for its actuation. As a result, the discrete hardware keys in such systems foster accurate data entry at high speeds. One major disadvantage of such hardware systems, however, is that the keyboard layouts are either permanent, or are cumbersome and expensive to reconfigure. Hence, these systems generally are standardized and not tailored to individual users. Moreover, separate systems must be designed and produced for use in different applications.

Computer-based systems have long dominated efforts to resolve the shortcomings of such traditional hardware systems. User-centered tailoring of the hardware and software of a computer system to the functional requirements of the market and industry it is designed for has been shown to improve operator performance and operational effectiveness.

In particular, touch screens have been widely adopted as replacements for traditional user interface hardware such as mechanically-actuated keypads or keyboards, because of their ease and versatility of operation. A user interface system having a touch screen display can, for example, be programmed so that the screen displays graphic objects to facilitate data entry. Such graphic objects can include, for example, menus, collections of icons, and representations of characters, numerals, buttons, tabs and the like. An operator enters data into such a user interface system by touching the screen in appropriate locations as suggested by the graphic objects. The screen senses the touch, and the grid position of the touch on the screen. The user interface system interprets the touch in accordance with its programming and registers the data indicated by the touch. Touch screen systems can easily be reprogrammed with any desired array of graphic objects tailored to the needs of the application and the operator. Such reprogramming is rapid and inexpensive, as it is implemented in software with no requirement for costly hardware design changes.

Touch screens are used in a wide variety of applications. One common application is point-of-sale (POS) display screens used in retail sales. Another application is in master controls for industrial machinery, which can operate, for example, an entire factory, refinery, or warehouse. Where accuracy is critical, operation of a touch screen by direct manipulation can generate an unacceptable risk of errors. The graphic objects displayed on a touch screen are implemented together on a unitary, approximately flat surface. Hence, the accuracy with which a user touches a location with the requisite contact pressure required to actuate one selected graphic object out of many displayed on the same touch screen cannot be controlled by the touch screen itself. As a result, a finger carelessly applied to a portion of the touch screen adjacent to an intended portion selected, can result in erroneous data entry, double data entry, or in data non-entry. In addition, where an operator is handicapped, or has the task of operating a touch screen over an extended time period, direct manipulation can lead to errors caused by fatigue, impatience, inattentiveness and other human factors. These problems also lead to slow data input speeds, as the typical operator attempts to exercise care to minimize errors. Accordingly, there is a need for reconfigurable touch screen—based user interface systems that can be operated and reprogrammed with improved accuracy and ease of use.

SUMMARY OF THE INVENTION

The present invention provides user interface systems comprising a touch screen actuator and a tactile key, in which the tactile key is placed adjacent to the touch screen actuator so that manipulation of the tactile key can be detected by the touch screen actuator. The invention also provides tactile key modules that can be placed adjacent to a touch screen actuator, and methods of producing such user interface systems, as well as techniques for readily repositioning such tactile key modules.

In one embodiment, the present invention provides a user interface system for inputting information, comprising a touch screen and a tactile key having a tactile surface, in which the tactile key is placed adjacent to a touch screen actuator within the touch screen, such that manipulation of the tactile surface is detectable by the touch screen actuator. The function of the tactile key may be mapped through the touch screen actuator to a program for execution of the function. The tactile key may be secured in position adjacent to the touch screen actuator. The tactile key may also be designed to be repositioned adjacent to a different touch screen actuator.

In another embodiment, the present invention provides a method of producing a user interface system for inputting information comprising a touch screen and a tactile key having a tactile surface. The method comprises placing the tactile key adjacent to a touch screen actuator within the touch screen, such that manipulation of the tactile surface is detectable by the touch screen actuator. The method may include mapping the function of the tactile key through the touch screen actuator to a program for execution of the function. The tactile key may be secured in a fixed position adjacent to the touch screen actuator. Alternatively, it may be positioned in a manner so that it can be readily repositioned adjacent to a different touch screen actuator.

In yet a further embodiment, the present invention provides a tactile key module for inputting information into a user interface system, comprising a tactile surface, a housing for disposing the tactile surface toward a user position, a contact surface provided in a portion of the housing away from the user position, and a signal transfer unit between the tactile surface and the contact surface, so that manipulation of the tactile surface causes a detectable change at the contact surface. The contact surface may be adapted to be placed adjacent to a touch screen actuator. The tactile key module may comprise means for securing the contact surface adjacent to a fixed touch screen actuator, or it may be adjustably mounted so that it can be moved from a first position adjacent to a first touch screen actuator to a second position adjacent to a different touch screen actuator.

A more complete understanding of the present invention, as well as other features and advantages of the invention, will be apparent from the following detailed description and the accompanying drawings.

BRIEF DESCRIPTION OF THE DRAWINGS

FIG. 20 is a view of an overlay of a choice-driven interface in conjunction with the first key module of FIG. 7;

FIGS. 21A and 21B show a flow diagram of the operation of a choice-driven interface in connection with a retail transaction;

FIGS. 22-33 illustrate exemplary overlays of a choice-driven interface in conjunction with the first key module of FIG. 7;

DETAILED DESCRIPTION

According to one aspect of the present invention, a software upgrade kit and one or more key modules can be readily utilized to add additional key capacity to an existing point of sale (POS) or other terminal having a touch screen user interface, such as an NCR DynaKey™ POS device. Further details of such systems are found, for example, in U.S. Pat. No. 6,002,395 and 5,920,312 which are incorporated by reference herein in their entirety. See also U.S. Pat. No. 6,411,286 which is also incorporated by reference herein in its entirety. While the present invention is described in the context of such terminals, it will be recognized that the present teachings can be adapted to various touch screen based terminals to provide a high degree of design and user flexibility in a cost effective manner, as addressed in greater detail below.

Figure 1:
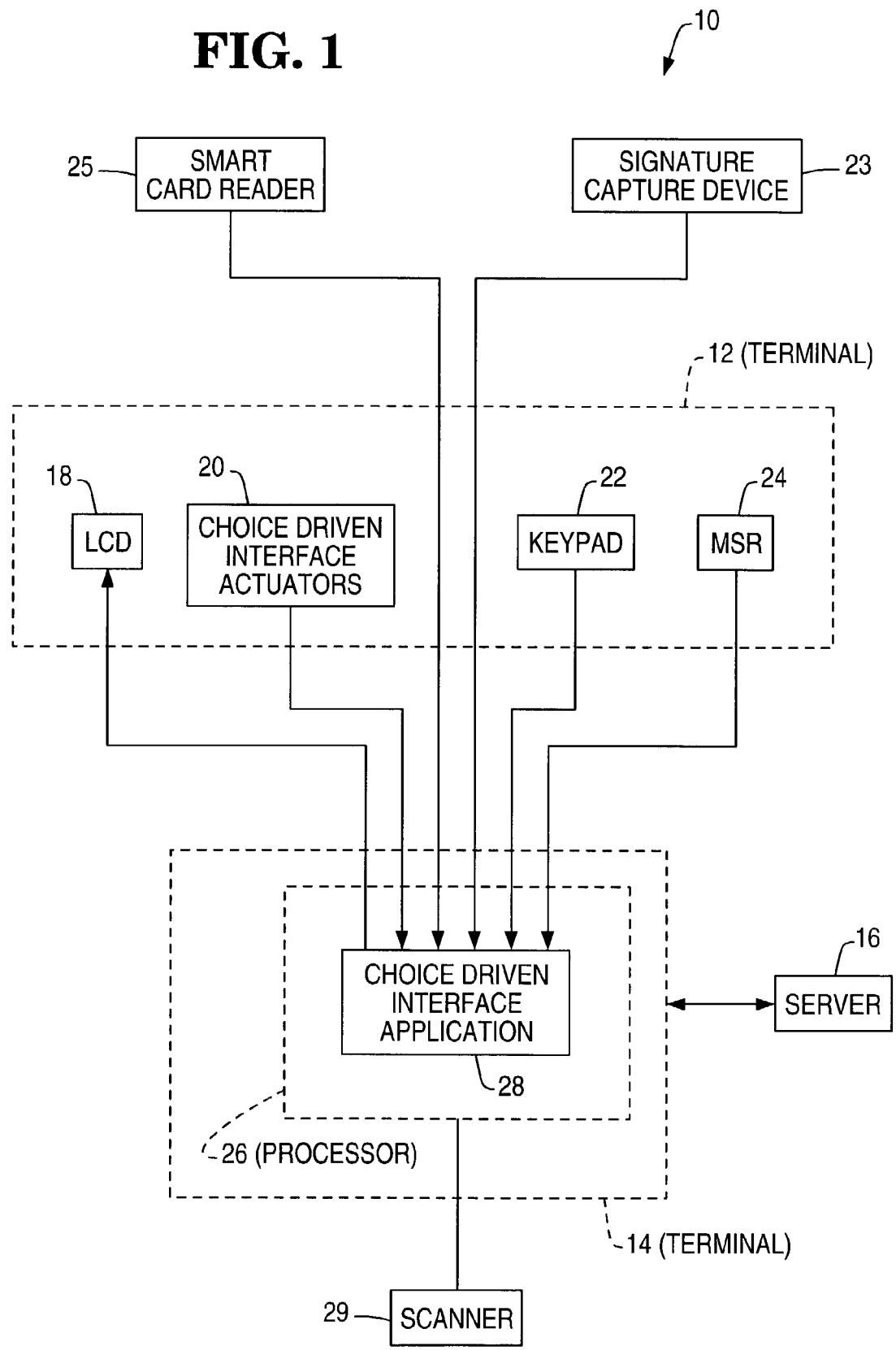
FIG. 1 is a block diagram of a key terminal which may suitably be adapted to implement the present invention.

FIGS. 1-4 show exemplary embodiments of a touch screen user interface system which may be suitably modified to implement the present invention as discussed in greater detail below. FIG. 1 shows a block diagram of a system 10 including a dynamic key terminal 12, and a terminal 14. In a network environment, system 10 also includes server 16.

Terminal 12 includes a touch screen liquid crystal display (LCD) 18, choice-driven interface actuators 20, and keypad 22. In one embodiment shown in FIG. 2, choice-driven interface actuators 20 are implemented as a group of eight mechanical choice buttons 35 located immediately to the right of the righthand edge of touch screen LCD 18. In another embodiment shown in FIG. 3, choice-driven interface actuators 20 are implemented as a group of eight touch screen actuators 37 displayed on LCD touch screen 18. Terminal 12 may also suitably include other peripheral devices, such as a magnetic stripe reader (MSR) 24. In both FIGS. 2 and 3, LCD 18 displays the choice-driven interface 21. Other conventional peripherals, not shown in FIGS. 2-4, may include a receipt printer, a cash drawer, and a 2×20 character customer display.

A user typically employs choice-driven interface actuators 20 to enter user inputs corresponding to displayed interface choices. Choice-driven interface actuators 20 record user choices in response to instructions and choice queries displayed by LCD 18. The functions associated with choice-driven interface actuators 20 change and are specific to each overlay generated by choice-driven interface application program 28.

Keypad 22 provides numerical keys and other standard retail function keys. Keypad 22 may be used to implement any of the functional choices displayed by choice driven interface application program 28, either alone or in combination with the choice-driven interface actuators 20, thereby providing a plurality of ways to accomplish the same function.

Figure 2:
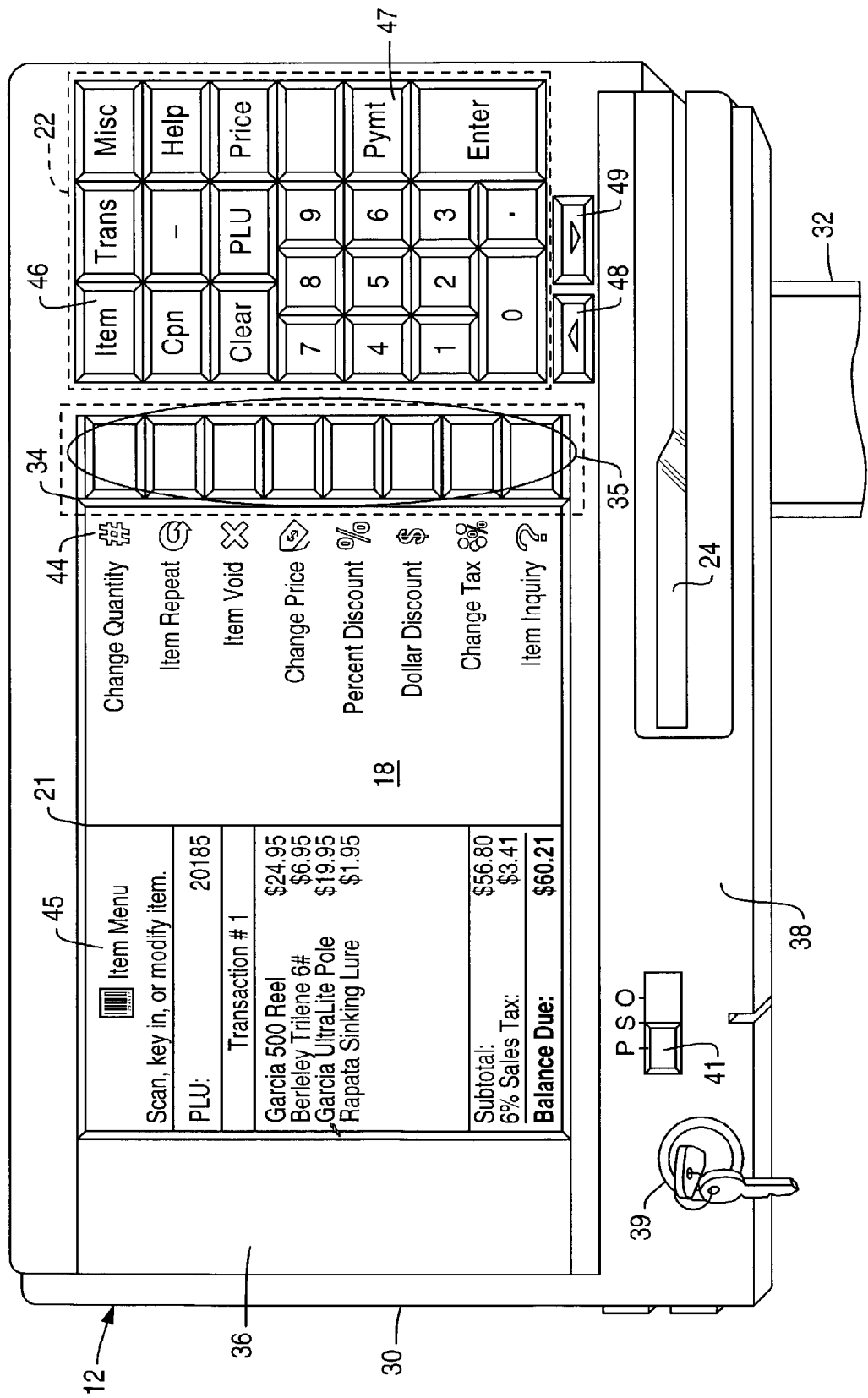
FIG. 2 is a front view of a key terminal which may suitably be adapted to implement the present invention.

MSR 24 reads magnetic stripes on credit and debit cards. An "up" cursor control key 48 and a "down" cursor control key 49 shown in FIG. 2 are provided for scrolling through displayed screen data.

Terminal 14 includes a processor 26 which executes choice-driven interface application program 28. Processor 26 responds to user inputs from choice-driven interface actuators 20, keypad 22, and MSR 24 by displaying instruction and choice query overlays generated by choice-driven interface application program 28.

Choice-driven interface application program 28 provides a graphic interface for executing known terminal functions. Choice-driven interface application program 28 may be implemented to run in a Microsoft disk operating system (DOS) or Windows environment.

Server 16 may suitably store choice-driven interface application program 28 and makes it available for loading by terminal 14.

Scanner 29 provides item information to processor 26. For example, in a typical POS application, an operator scans items to be purchased utilizing scanner 29. Price information is located for the scanned items in a price look up (PLU) table and a receipt is generated.

Terminal 12 may also include ports for connecting additional peripherals, including a signature capture device 23 and a SMART card reader 25.

Returning now to FIGS. 2-4, terminal 12 as shown further includes the following physical details. Terminal 12 includes housing 30 and housing support stand 32. Housing 30 includes a display and input portion 36 and an MSR portion 38. The display and input portion 36 is generally rectangular in shape and includes LCD 18, choice-driven interface actuators 20, and keypad 22. MSR portion 38 is preferably inclined slightly towards an operator as best seen in FIG. 4 and contains the MSR 24.

LCD 18, choice-driven interface actuators 20, keypad 22 and magnetic stripe reader 24 are preferably organized within housing 30 in accordance with recommendations from human factors research so that components are located in the most ergonomic and user-friendly locations. Keypad 22 is rectangular in shape and is arranged vertically. MSR 24 is located horizontally in MSR portion 38. LCD 18 is located on the side opposite keypad 22. Choice-driven interface actuators 20 are vertically arranged one over the other along one side 34 of LCD 18. As will be discussed in greater detail below, no matter how well a product is designed, the needs of different customers or different operators may make it desirable to provide an additional level of flexibility not found in prior art approaches in which all of the physical, mechanical keys used in operation of the unit are typically located in exactly the same location for every single unit manufactured.

Figure 3:
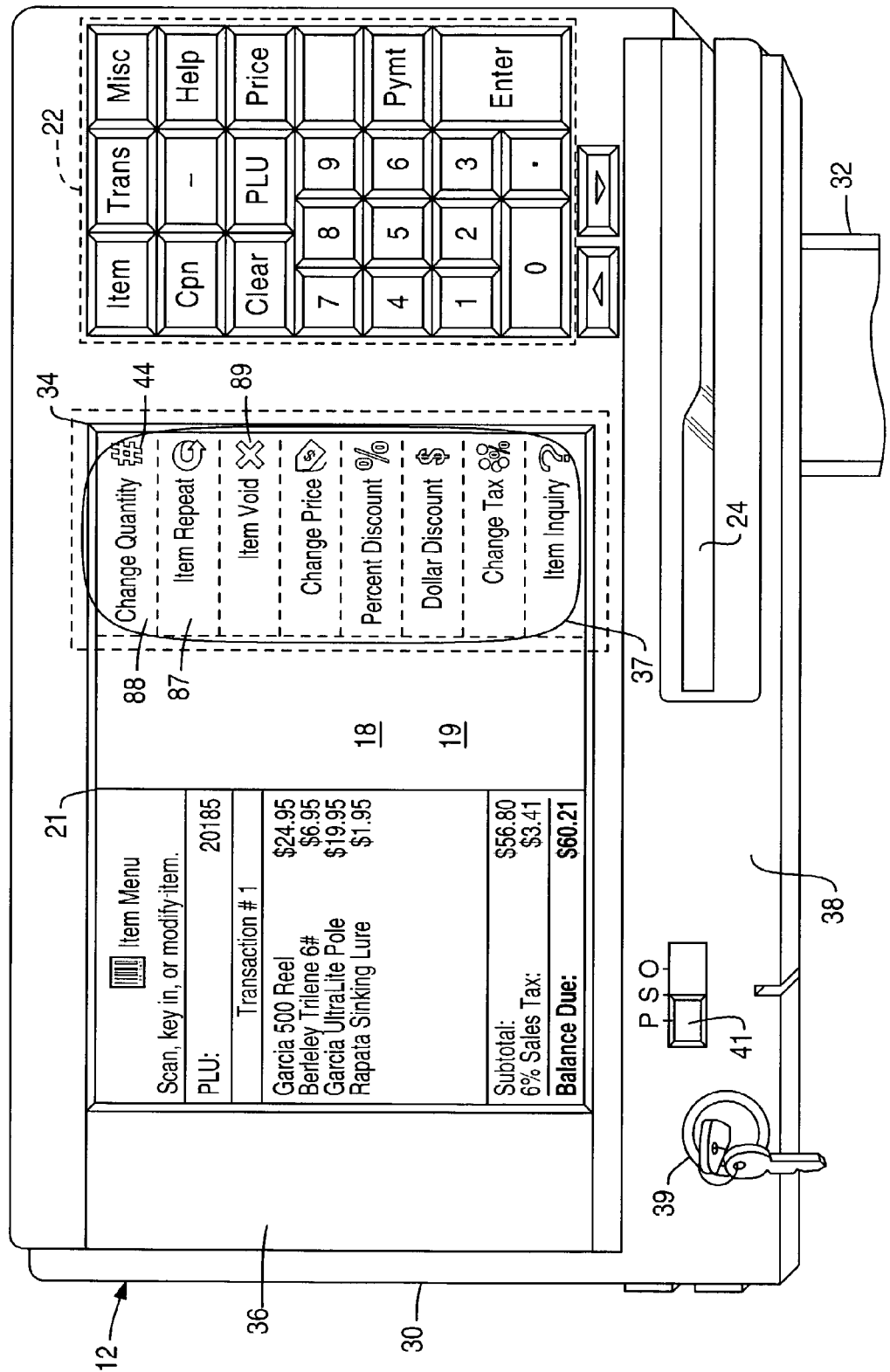
FIG. 3 is a front view of another embodiment of a key terminal which may suitably be adapted to implement the present invention.
Figure 4:
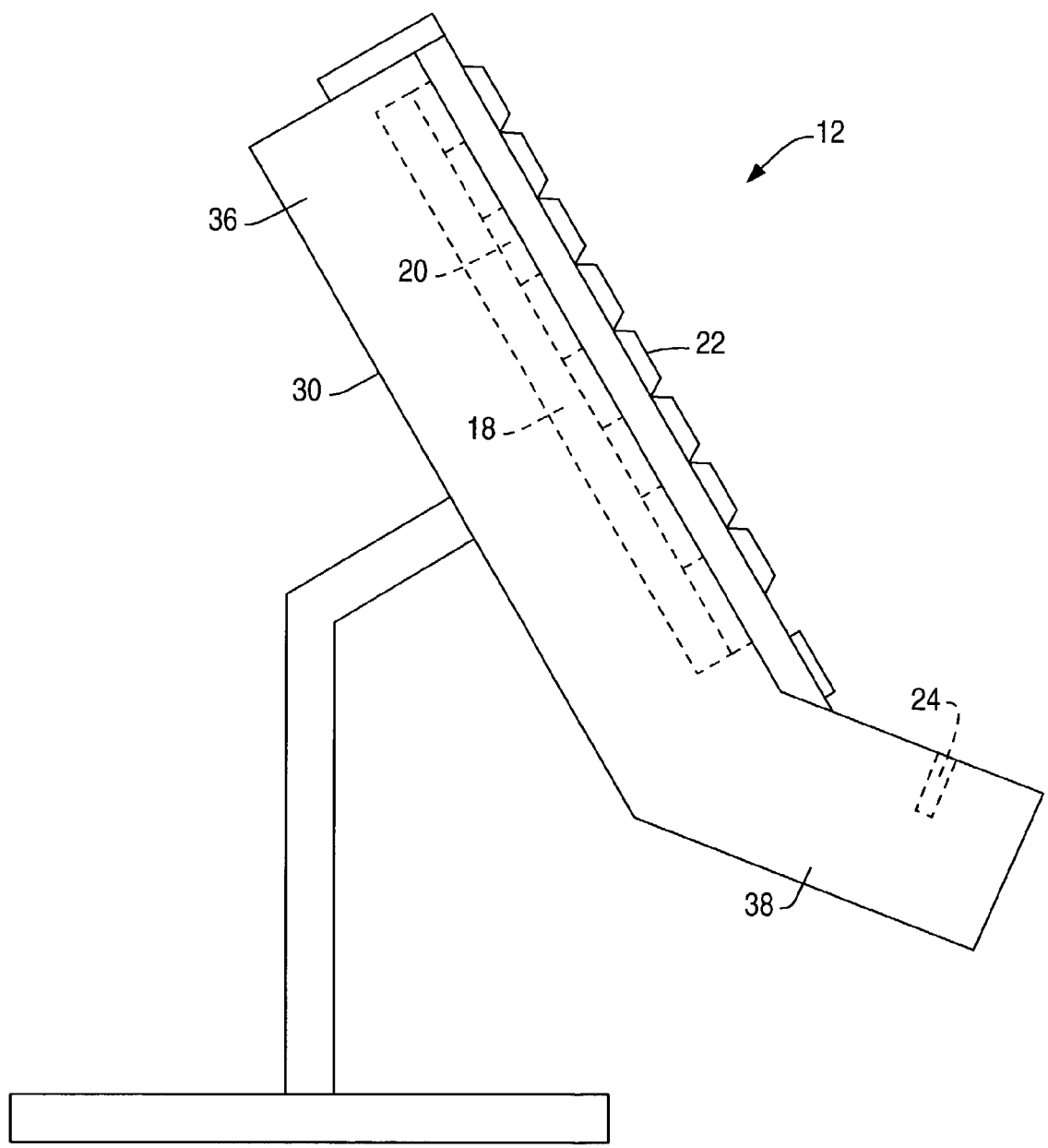
FIG. 4 is a side view of a key terminal which may suitably be adapted to implement the present invention.

Returning to the discussion of FIGS. 2-4, housing support stand 32 supports terminal 12 above the checkout counter, typically behind a scanner within the checkout counter and facing the operator. Housing support stand 32 also provides a conduit for wiring between terminal 12 and terminal 14, a portion of which wiring is generally located within the checkout counter for a retail application. Terminal 12 may be rotated about housing support stand 32 for operator comfort.

Further, key lock 39 allows terminal 12 to be secured from unauthorized use. Power/standby switch 41 has three positions, "P" for "On", "S" for "Standby", and "O" for "Off". The standby position places terminals 12 and 14 into a low-power mode.

With reference to FIG. 2, mechanical choice buttons 35 are arranged vertically just to the right of the righthand edge of LCD 18 and adjacent to corresponding user-driven interface choices 44 displayed by LCD 18. When pressure is applied to the tactile surfaces of mechanical choice buttons 35, typically by a fingertip, a direct mechanical linkage generates and transmits a signal from the tactile surface to further components, which generally may be electrical or mechanical components, or a combination thereof, within the touch screen user interface system 10. A portion 45 of LCD 18 displays the heading "Item Menu," which has been selected to be displayed by pressing "Item" button 46. Pressing item button 46 also determines the group of user-driven interface choices 44 displayed by LCD 18. As shown in FIG. 2, this group includes "Change Quantity," "Item Repeat," "Item Void," "Change Price," "Percent Discount," "Dollar Discount," "Change Tax," and "Item Inquiry."

Figure 5:
FIG. 5 is a view of an overlay of a choice-driven interface.

FIG. 5 shows LCD 18 of FIG. 2 after "Pymt" button 47 has been selected. As shown in FIG. 5, a portion 45 of LCD 18 displays the heading "$ Payment." Pressing Pymt button 47 also determines the group of user-driven interface choices 44 displayed by LCD 18. This group includes "Cash," "Personal Checks," "Smart Card," "Credit Card," "Foodstamp ($0.00)," "Gift Certificate," "Traveler's Check," and "Other Payments." The choice that is displayed adjacent to each choice-driven interface actuator 20 may be composed of either a text label, a pictorial element, or both. FIGS. 2 and 5 demonstrate that the functions of choice-driven interface actuators 20 displayed as user-driven interface choices 44 adjacent thereto, collectively change as an operator selects between the "Item" button 46 and "Pymt" button 47. Since the functions of choice-driven interface actuators 20 can thus be changed, they are referred to herein as dynamic keys. In contrast, the functions of the keys of keypad 22, including the non-numeric keys within it, are fixed. They are referred to herein as static keys.

Dynamic keys such as those shown in FIG. 2 create a desirable expansion of the key selection capacity of the system, as each choice-driven interface actuator 20 can be programmed to display several different user-driven interface choices 44, as selected in groups by buttons such as Item button 46 and Pymt button 47. Choice-driven interface actuators 20 themselves are mechanically actuated, permitting operation of such keys at high speed with high accuracy. However, the flexibility and capacity of this system embodiment still have important limitations. The locations as well as the functions of the mechanically-actuated choice-driven interface actuators 20 shown in FIG. 2 are fixed, and a left-handed operator will have to reach across his or her line of sight to the LCD 18 in order to manipulate the choice-driven interface actuators 20. Further, the number of potential user-driven interface choices 44 in this embodiment is limited to the product of the number of choice-driven interface actuators 20 installed in the touch screen user interface system 10 multiplied by the number of available static selection buttons, such as Item button 46 and Pymt button 47, installed in the system.

Referring to FIG. 3, the choice-driven interface actuators 20 in this embodiment are implemented as user-driven interface choices 44 displayed directly on LCD touch screen 18. Accordingly, touch screen actuators 37 are positioned over each of the user-driven interface choices 44, enabling their actuation. For example, the user-driven interface choices 44 including "Item Repeat" button 87, "Change Quantity" button 88, and "Item Void" button 89 are implemented directly in LCD 18 and are actuated by overlaid touch screen actuators 37. If the operator desires, for example, to automatically repeat the key entries for a multiply-purchased item, such as item and price indications, he or she must manipulate the "Item Repeat" button by contacting the touch screen actuator 37 over the "Item Repeat" choice 87.

Since the user-driven interface choices 44 including buttons 87, 88 and 89 are implemented directly in LCD 18 in this embodiment, their functions are entirely determined by the system operating software. Accordingly, the display locations and cumulative numbers of user-driven interface choices 44 are limited only by the display area of LCD 18. However, the use of touch screen actuators 37 may result in erroneous data entry. For example, in attempting to activate the "Item Repeat" button 87 by manipulating the touch screen actuator 37 over such button 87, an operator may inadvertently manipulate the touch screen actuator 37 over the "Change Quantity" button 88 or the "Item Void" button 89. Although the touch screen actuators 37 could be separated by moving the user-driven interface choices 44 apart from each other, the LCD 18 is of limited size, and the greater the separation the larger the portion of LCD 18 that is dedicated to touch screen actuators, thus potentially unduly limiting the ability to display other information on the LCD 18.

Figure 6:
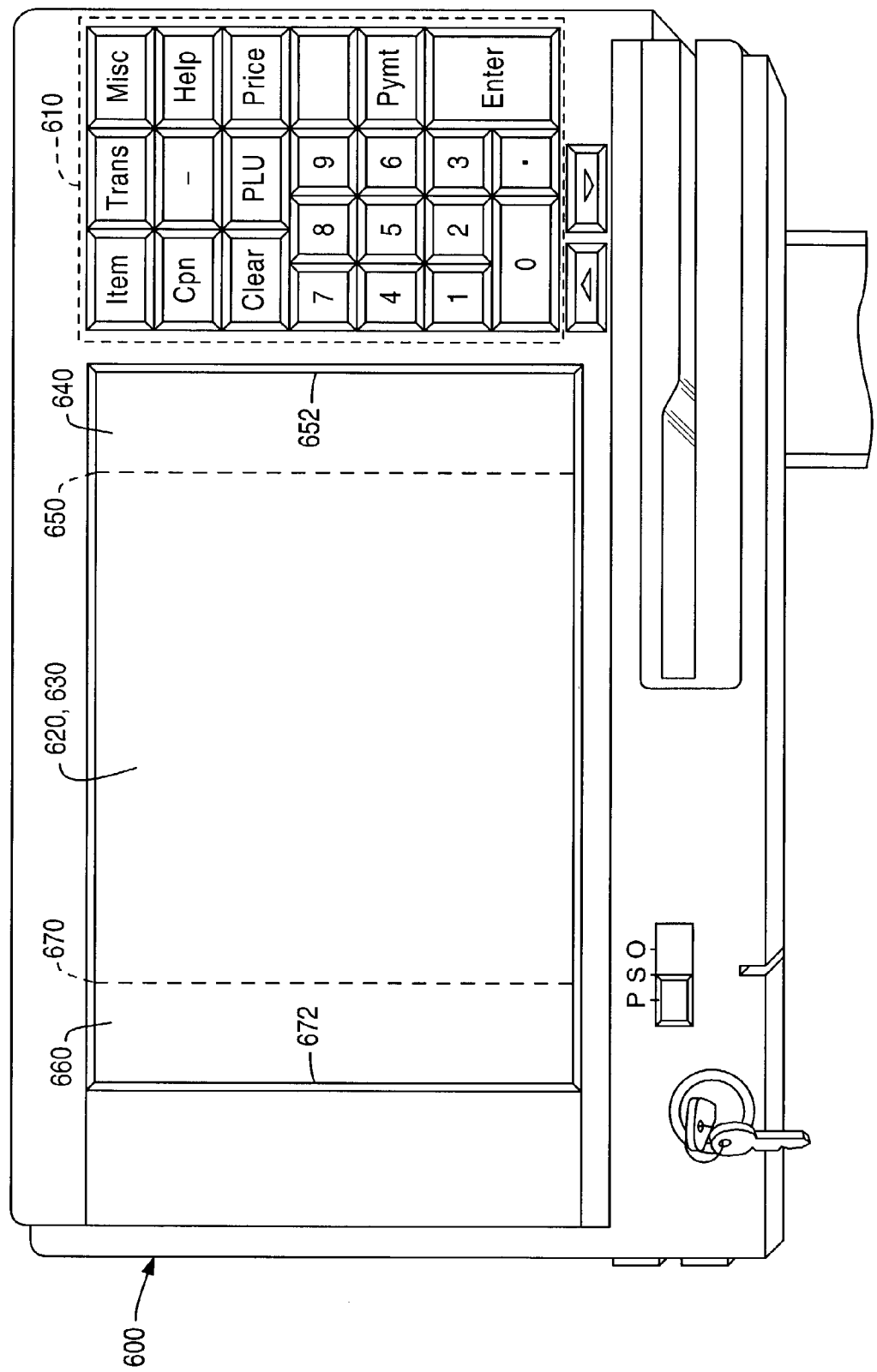
FIG. 6 is a view of another key terminal which may suitably be adapted to implement the present invention.

FIG. 6 shows an exemplary embodiment of a touch screen user interface system 600 that is ready to be modified in accordance with the present invention. The system 600 includes a mechanically-actuated, permanently installed keypad 610. Further, the system 600 includes LCD 620, the top surface of which is covered by coextensive touch screen 630. This touch screen user interface system 600 is fully operational as shown, as it is integrated with the other components shown in FIG. 1 as discussed above. However, touch screen user interface system 600 will be modified by the addition to touch screen 630 of key modules to now be described that are produced, installed and configured according to the teachings of the present invention.

Figure 7:
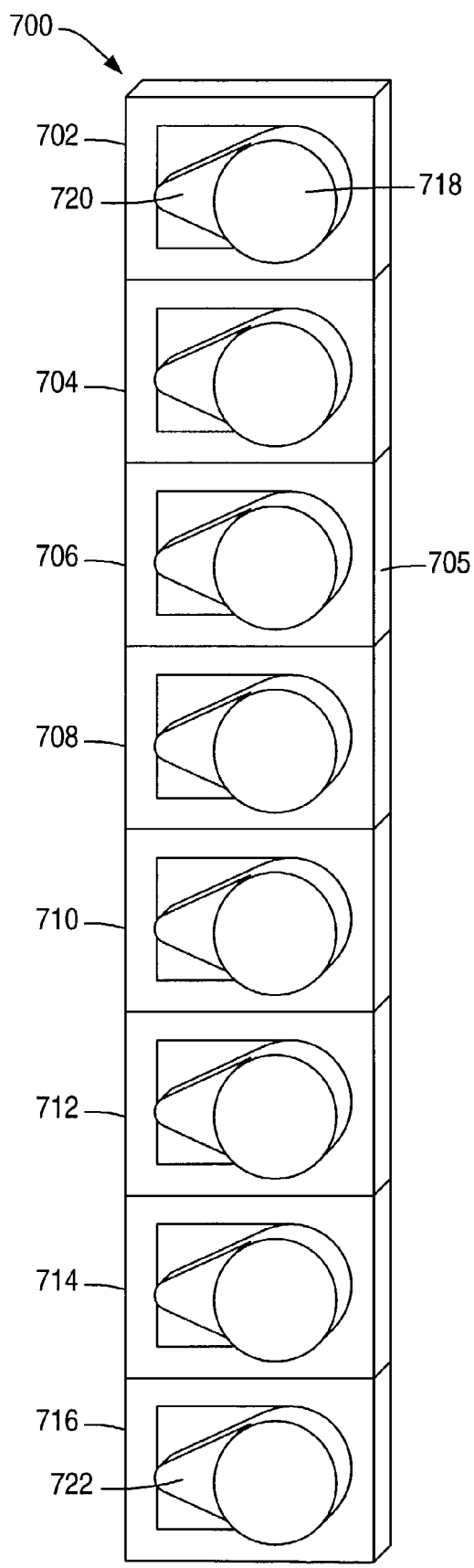
FIG. 7 is a top view of a first key module according to the present invention.
Figure 11:
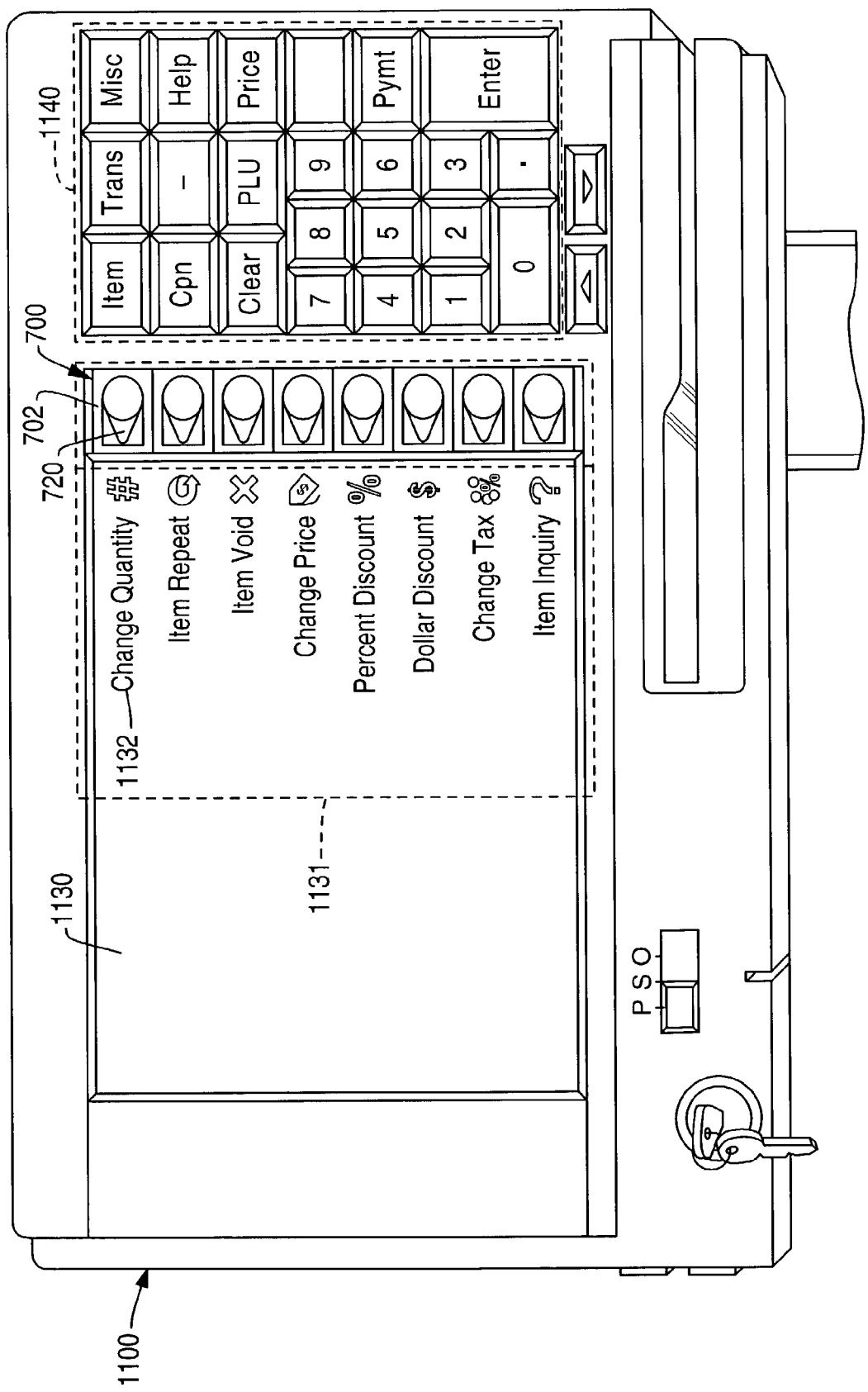
FIG. 11 is a view of a touch screen user interface system according to the present invention which employs the first key module of FIG. 7.

FIG. 7 is a top perspective view of an exemplary eight-key unitary module 700 according to the present invention. The module 700 includes keys 702, 704, 706, 708, 710, 712, 714, and 716 and a suitable molded plastic housing 705. The keys 702-716 are not labeled with their functions, because they are designed to be implemented as dynamic keys. Referring to exemplary key 702, each of the keys 702-716 includes a tactile surface 718 suitable to be manually actuated by touching, having an integral arrow 720. The arrow 720 on each tactile surface 718 is to preferably be used in conjunction with a touch screen display on an adjacent portion of touch screen 630, to provide the key with a dynamic function label such as a choice 44 shown in FIG. 3, after installation in touch screen user interface system 600, as further discussed below. The arrows serve to lead the operator's eye to the appropriate dynamic function label as also seen in FIG. 11, for example.

Figure 8:
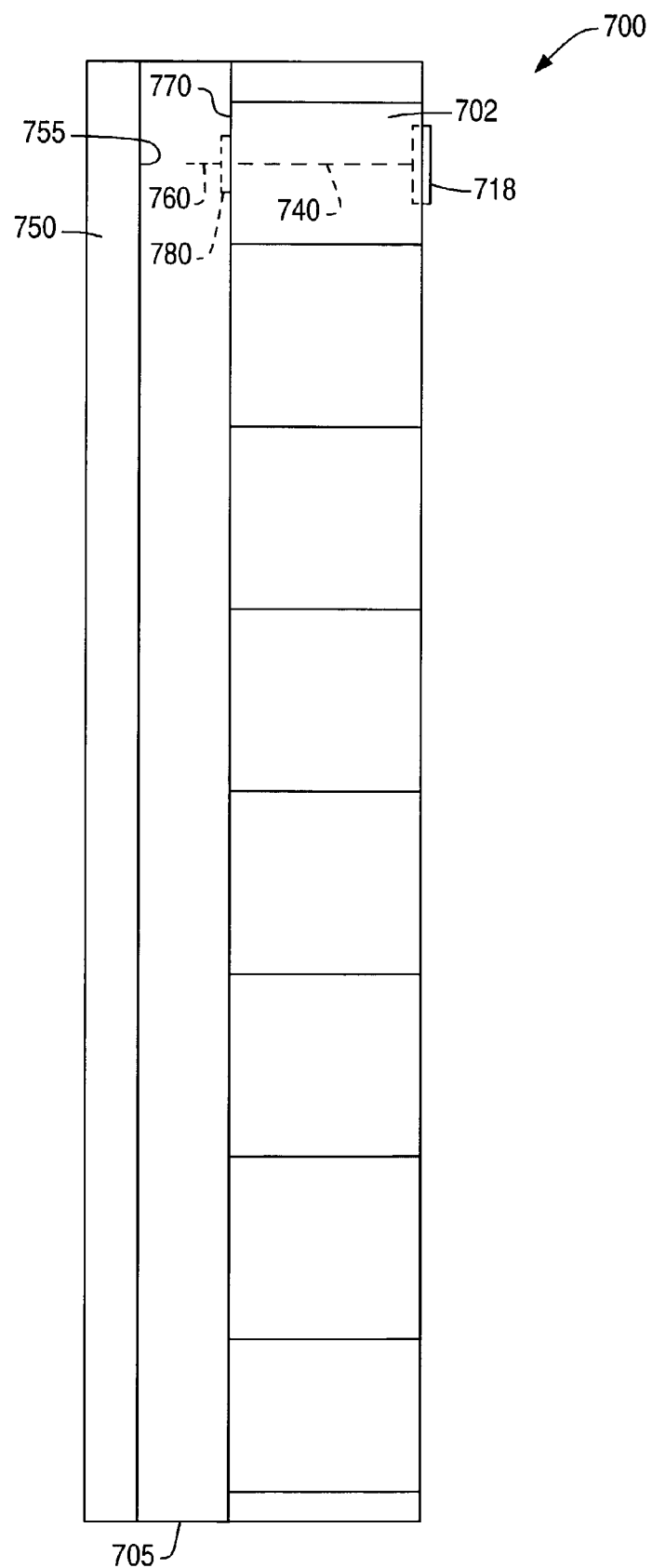
FIG. 8 is a side view of the key module of FIG. 7 according to the present invention.

FIG. 8 is a cross-sectional side view of the module 700 shown in FIG. 7 with the bottom of its housing placed against a touch screen 750 having a plurality of touch screen actuators. Exemplary key 702 includes tactile surface 718 which coordinates with a signal transfer unit 740 to actuate a touch screen actuator 755 located beneath key 702, when key 702 is pressed by an operator. Tactile surface 718 can be any component suitable to be manually struck as a key, and can have any suitable raised, depressed, patterned, textured, labeled, or other suitable surface. Signal transfer unit 740 can be any component suitable for being detected by the touch screen actuator 755 in touch screen 750. Signal transfer unit 740 can operate, for example, mechanically, electrically, or optically. The signal transfer unit 740 thus provides a mechanical, electrical or optical signal adjacent touch screen actuator 755 of touch screen 750 which is then detected by the appropriate touch screen actuator 755 in the chosen touch screen 750.

Several conventional types of touch screens are known. For example, surface wave touch screens locate the absorption of surface acoustic waves propagating in the front panel of the touch screen, the absorption occurring as a result of the contact between the panel and soft tissue such as the user's finger. Where this type of touch screen is employed, signal transfer unit 740 is adapted to generate an acoustic wave at the touch screen actuator 755 of touch screen 750 that is located beneath tactile surface 718. Such an acoustic wave can be generated, for example, by movement of a contact tip 760 provided on signal transfer unit 740 into physical contact with touch screen actuator 755. To this end, contact tip 760 may pass through an opening in housing 705. Such projection can be caused by pressure applied to tactile surface 718. Alternatively, for example, signal transfer unit 740 can itself generate an acoustic signal that is projected in the direction of touch screen actuator 755 of touch screen 750. Other types of touch screens operate in a resistive, capacitive or optical manner. Resistive touch screens detect localized contact pressure. Capacitive touch screens detect localized displacement of an electric field propagating across the length and breadth of the touch screen, caused by touching the screen. Optical touch screens operate, for example, by detecting changes in the level of light impacting on a localized area of the touch screen.

Implementation of signal transfer units operating electrically or optically will require a power source to generate the respective electrical or optical signals. Key modules then will be provided with electrical power supply lines that can be interconnected and also connected to a power source implemented elsewhere in the touch screen user interface system. A modular approach might employ battery power.

Figure 9:
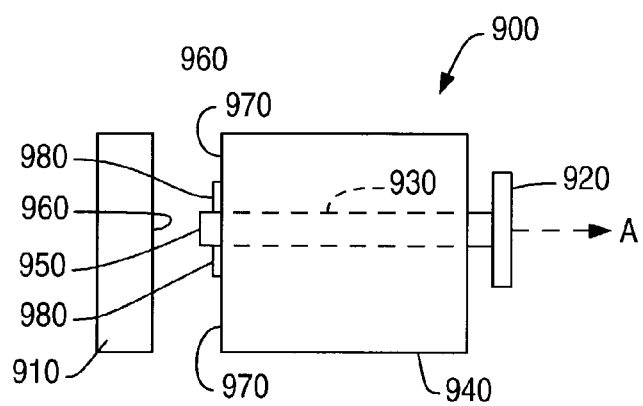
FIG. 9 is a view of a second key module according to the present invention.

FIG. 9 is a cross-sectional side view of an exemplary embodiment of a single key module 900. In addition to unitary multi-key modules, separate key modules such as single key module 900 can be attached to a touch screen actuator 960 in a touch screen 910. In this embodiment, the key module 900 comprises tactile surface 920, signal transfer unit 930, and housing 940. The purpose of the housing 940 is to maintain the tactile surface 920 and signal transfer unit 930 in position over touch screen 910 and to dispose the tactile surface 920 toward a user position indicated by arrow A. In this embodiment, signal transfer unit 930 is a plunger having a contact tip 950. Upon application of manual pressure to tactile surface 920, signal transfer unit 930 is displaced in a direction toward touch screen 910, causing contact tip 950 to make contact with and generate an acoustic signal on the surface of touch screen actuator 960 of the touch screen.

Figure 10:
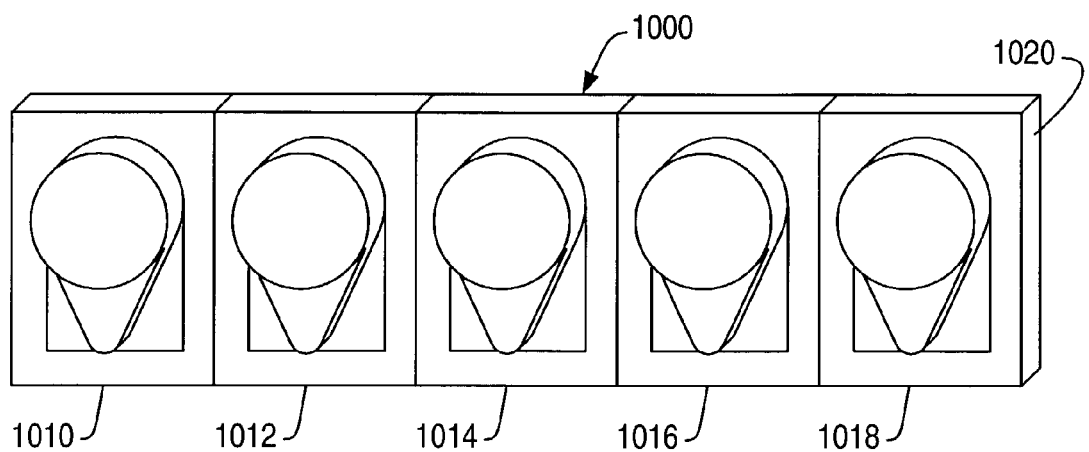
FIG. 10 is a view of a third key module according to the present invention.

Other unitary multi-key modules comprising a plurality of keys can be provided in a wide variety of desirable configurations. For example, FIG. 10 is a top view of a horizontal array module 1000 including five keys 1010, 1012, 1014, 1016, and 1018 and a suitable housing 1020.

Referring again to FIG. 6, in one embodiment, the multi-key module 700 of FIG. 7 is installed onto touch screen 630 in a region 640 located between dotted line 650 and right edge 652 of touch screen 630. FIG. 11 shows the resulting touch screen user interface system 1100 including multi-key module 700 installed directly onto a touch screen 1130 adjacent appropriate user-driven interface choices 1131. Also shown is a mechanical, permanently integrated keypad 1140. The exemplary arrow 720 integrated into key 702 is positioned facing toward a touch screen actuator display "Change Quantity" 1132 displayed on a portion of the touch screen 1130 adjacent to key 702. This adjacent portion of the touch screen 1130 can be programmed, for example, to display any appropriate user-driven interface choices, such as the choices 44 of FIG. 3 or those shown in FIG. 5, FIG. 20, or FIGS. 22-33, or any others desired by a product designer or customer. This embodiment is particularly suited to right-handed operators, since they can manipulate keys 702-716 of module 700 without blocking their view of touch screen 1130.

Figure 12:
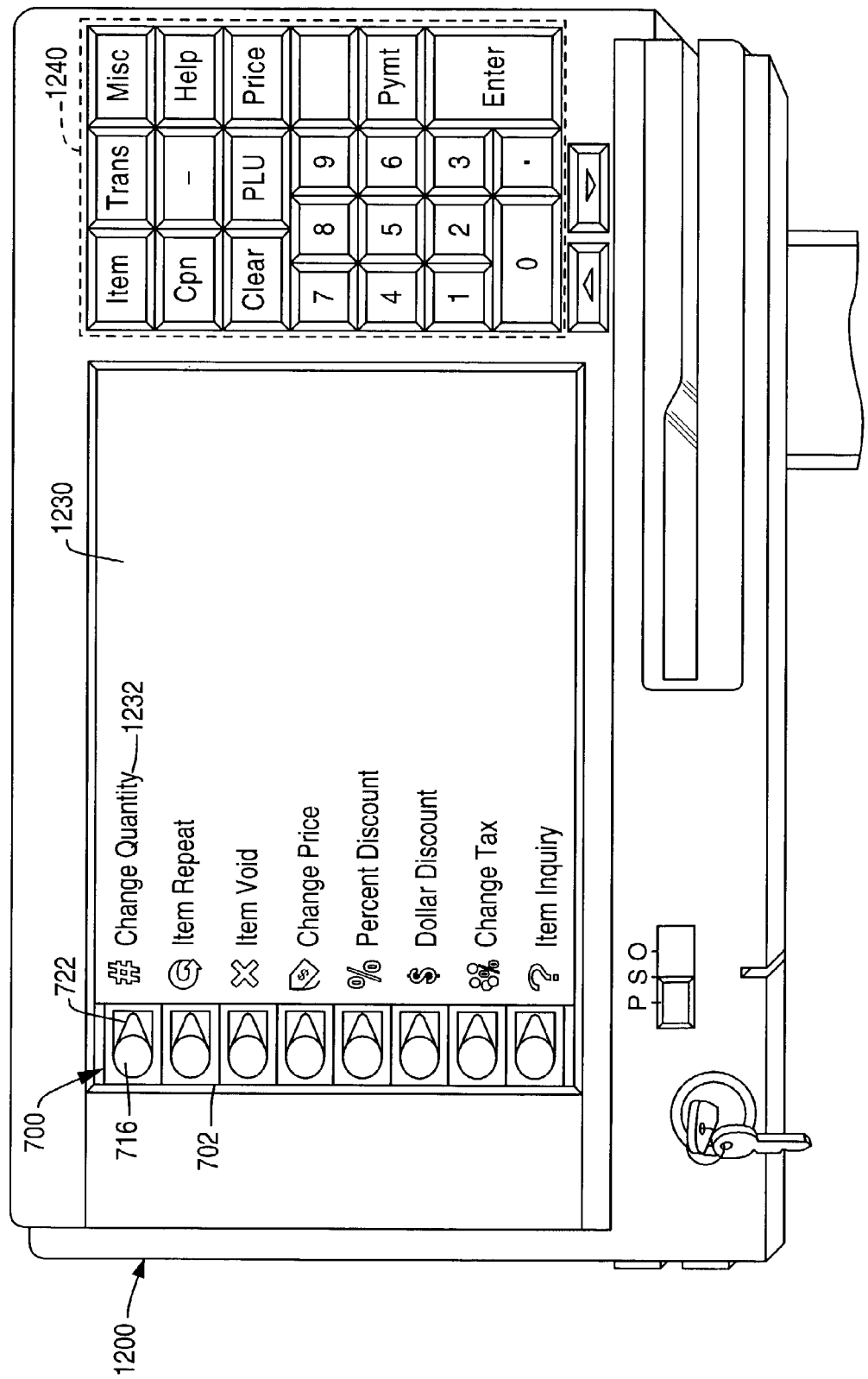
FIG. 12 is a view of another touch screen user interface system according to the present invention which employs the first key module of FIG. 7 in an alternative manner.

In another embodiment, the multi-key module 700 of FIG. 7 is installed onto touch screen 630 of FIG. 6 in the region 660 located between dotted line 670 and left edge 672 of touch screen 630. FIG. 12 shows resulting touch screen user interface system 1200 including module 700 with keys 702-716 installed directly onto touch screen 1230. For this embodiment, it is noted that key 716 is at the top and key 702 is now at the bottom. System 1200 also includes a mechanical, permanently integrated keypad 1240. The exemplary arrow 722 integrated into key 716 is positioned facing toward a touch screen actuator display on an adjacent portion of the touch screen 1230, such as "Change Quantity" 1232. While other displays are not shown for ease of illustration, it is noted that the adjacent exposed portion of the touch screen 1230 can be programmed, for example, to display user-driven interface choices 44 in the same manner as shown in FIG. 3 or as discussed above in connection with FIG. 11. This embodiment is particularly well adapted to left-handed operators, since these operators can manipulate keys 702-716 without blocking their view of touch screen 1230. The very same module 700 can be used with system 1100 and system 1200 by simply flipping it over and suitably programming the touch screen.

Figure 13:
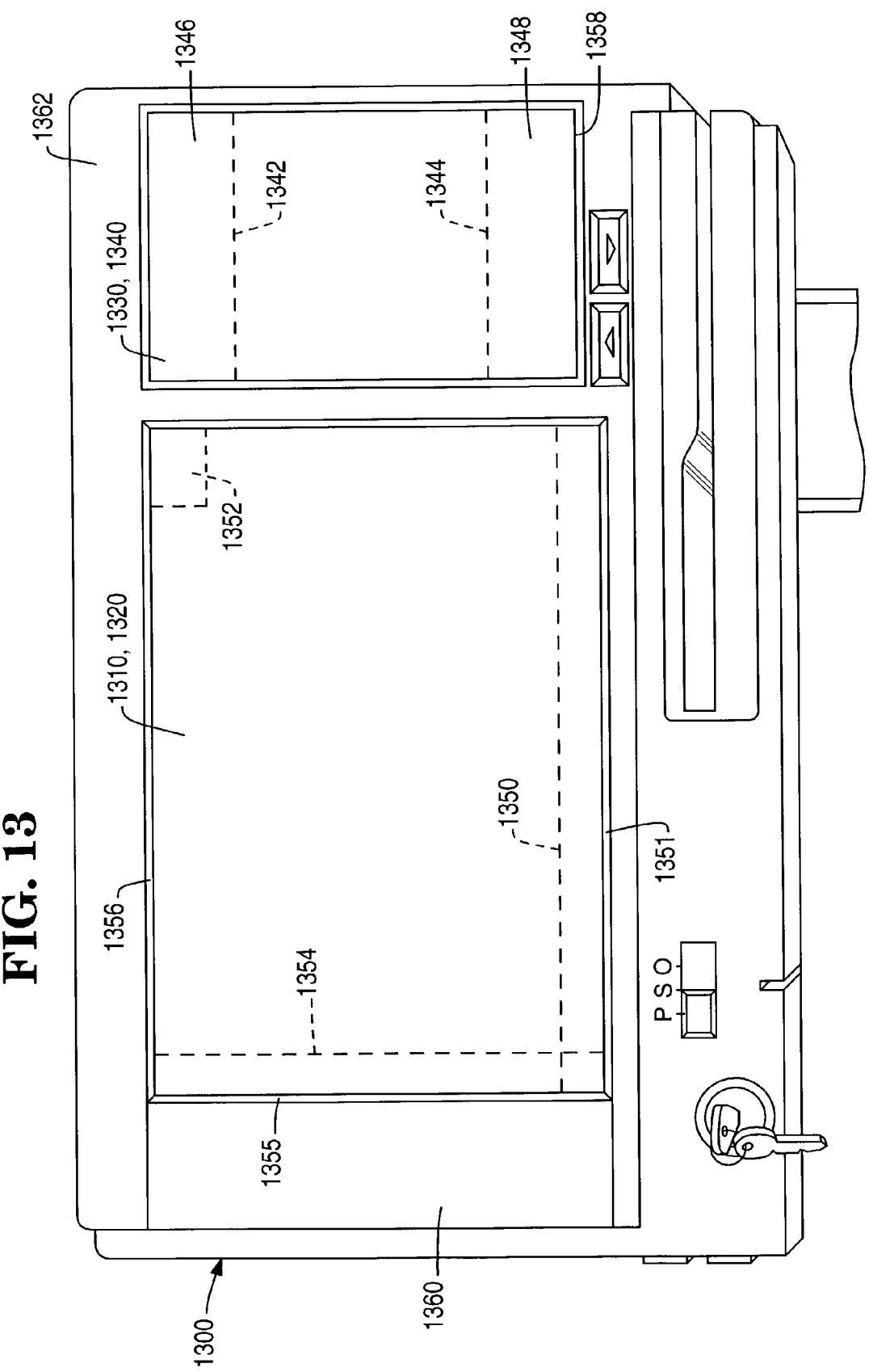
FIG. 13 is a view of another key terminal which may suitably be adapted to implement the present invention.

FIG. 13 shows another exemplary embodiment of a touch screen user interface system 1300 that can readily be modified in accordance with the present invention. The system 1300 includes a first LCD 1310, the top surface of which is covered by a coextensive touch screen 1320. Instead of a mechanical keypad such as keypad 610 shown in FIG. 6, the system 1300 further includes a second LCD 1330, the top surface of which is also covered by a coextensive touch screen 1340. This touch screen user interface system 1300 is preferably integrated with the other components such as those shown in FIG. 1 and discussed above. However, touch screen user interface system 1300 will be modified in accordance with the present invention by adding tactile key modules to touch screen 1320 and touch screen 1340 as described above in connection with FIGS. 7-10 or as further addressed below according to the teachings of the present invention.

Figure 14:
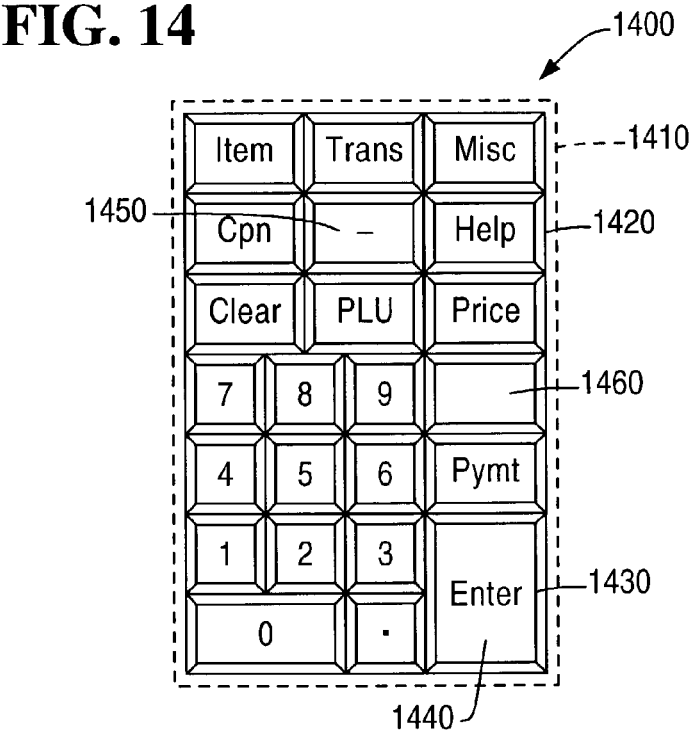
FIG. 14 is a view of a fourth key module according to the present invention.

FIG. 14 shows a top view of an exemplary keypad module 1400 according to the present invention. The module 1400 includes a bottom numeric keypad section 1410 integrated together with a top non-numeric function key section 1420, each bordered for illustration purposes by a dotted line, and a suitable housing, not shown. Referring to exemplary "Enter" key 1430, each of the keys includes a tactile surface 1440 suitable to be manually actuated by touching. The module 1400 includes two undesignated keys 1450 and 1460. All of the keys in keypad module 1400 except for undesignated keys 1450 and 1460 are labeled with defined functions. Accordingly, the keys of keypad module 1400 are designed to be implemented as static keys. Undesignated keys 1450 and 1460 do provide some flexibility, however, and can be labeled with any chosen function that then becomes fixed during configuration, as discussed further below. Keypad module 1400 is constructed in the same manner as are the key modules previously discussed in connection with FIGS. 8 and 9. This keypad module 1400 can be installed over second touch screen 1340 and utilize the touch screen user interface system 1300, as further discussed below.

Figure 15:
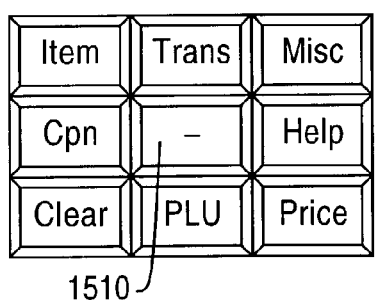
FIG. 15 is a view of a fifth key module according to the present invention.

FIG. 15 shows a top view of another exemplary key module 1500 according to the present invention. The module 1500 includes eight non-numeric function keys and an undesignated key 1510 arranged together in a rectangular block, and a suitable housing, not shown. All of the keys in key module 1500 except for undesignated key 1510 are labeled with defined functions. Accordingly, the keys of module 1500 are designed to be implemented as static keys. Undesignated key 1510 can be labeled with any chosen function that then becomes fixed during configuration. Key module 1500 is constructed in the same manner as is the keypad module of FIG. 14. This key module 1500 can also be installed in touch screen user interface system 1300, as discussed further below.

Figure 16:
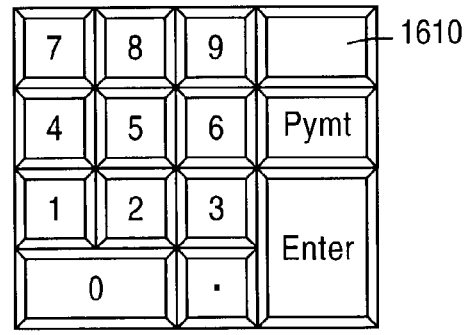
FIG. 16 is a view of a sixth key module according to the present invention.

FIG. 16 shows a top view of another exemplary keypad module 1600 according to the present invention. The module 1600 includes a numeric keypad together with "Pymt" and "Enter" keys as well as one undesignated key 1610, and a suitable housing, not shown. All of the keys in key module 1600 except for undesignated key 1610 are labeled with defined functions. Accordingly, the keys of module 1600 are designed to be implemented as static keys. Undesignated key 1610 can be labeled with any chosen function that then becomes fixed during configuration. Keypad module 1600 is constructed in the same manner as is the keypad module of FIG. 14. This keypad module 1600 can also be installed in touch screen user interface system 1300, as further discussed below.

Figure 17:
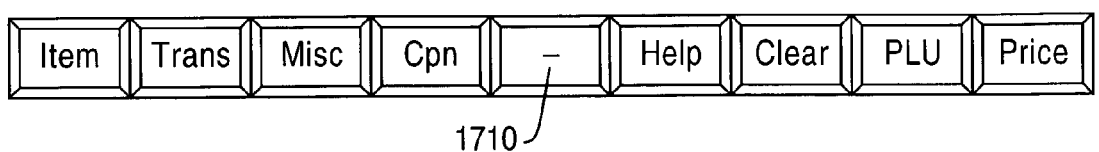
FIG. 17 is a view of a seventh key module according to the present invention.

FIG. 17 shows a top view of another exemplary key module 1700 according to the present invention. The module 1700 includes eight non-numeric function keys and undesignated key 1710 arranged together in a longitudinal block, and a suitable housing, not shown. All of the keys in key module 1700 except for undesignated key 1710 are labeled with defined functions. Accordingly, the keys of module 1700 are designed to be implemented as static keys. Undesignated key 1710 can be labeled with any chosen function that then becomes fixed during configuration. Key module 1700 is constructed in the same manner as is the keypad module of FIG. 14. This key module 1700 can also be installed in touch screen user interface system 1300, as further discussed below.

Referring again to FIG. 13, the touch screen user interface system 1300 includes two touch screens 1320 and 1340. Tactile key and keypad modules according to the invention can be installed over touch screen actuators in each of these touch screens. Such key and keypad modules can include dynamic key modules, for example, such as those shown in FIGS. 7 and 10. Such key and keypad modules can also include static key modules, for example, such as those shown in FIGS. 14-17. The touch screen user interface system of FIG. 13 includes first touch screen 1320, which is large and accordingly well suited for installation of dynamic keys requiring adjacent exposed portions of the touch screen to display user-driven interface choices or displays, such as choices 44 shown in FIG. 3. The touch screen user interface system of FIG. 13 also includes second touch screen 1340, which is small and accordingly best suited to installation of static keys without a corresponding dynamic choice or display.

Figure 18:
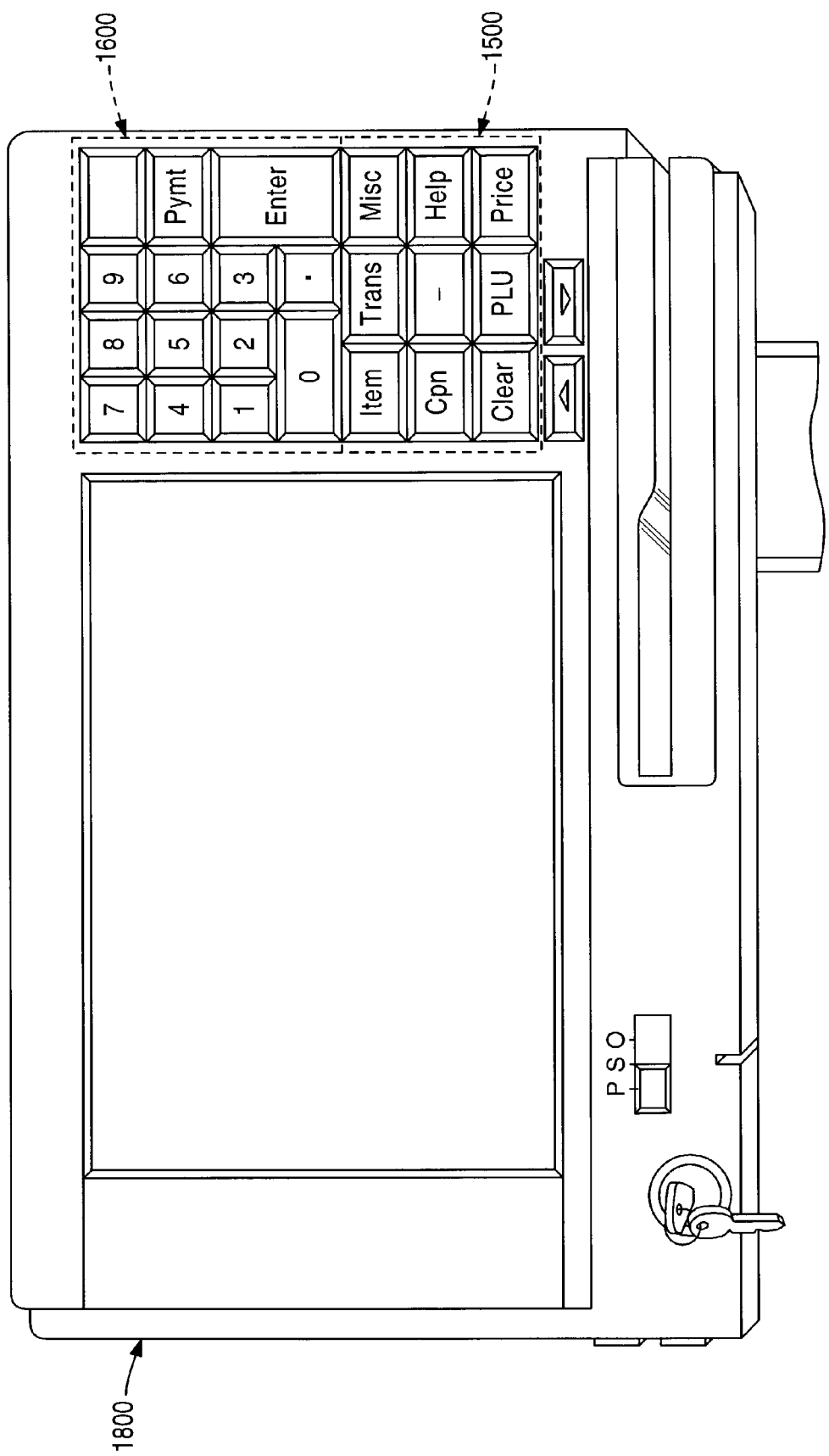
FIG. 18 is a view of another key terminal employing the fifth and sixth key modules of FIGS. 15 and 16, respectively, according to the present invention.

In one embodiment, the keypad 1400 of FIG. 14 is installed over touch screen 1340 of FIG. 13, completely covering the touch screen. Although the resulting touch screen user interface system appears identical to that shown in FIG. 6, touch screen 1340 of FIG. 13 offers configuration flexibility not available where mechanical keypad 610 of FIG. 6 is provided. For example, non-numeric key module 1500 of FIG. 15 and numeric keypad module 1600 of FIG. 16 can be installed onto touch screen 1340 of FIG. 13 instead of keypad 1400. If desired, for example, their relative positions can be reversed as shown in touch screen user interface system 1800 of FIG. 18. Alternatively, non-numeric key modules or numeric keypad modules with characters in a different language, or desired colors, or Braille, can be substituted. Further, a non-numeric key module labeled with different functions than those shown in FIG. 15 can be substituted.

Figure 19:
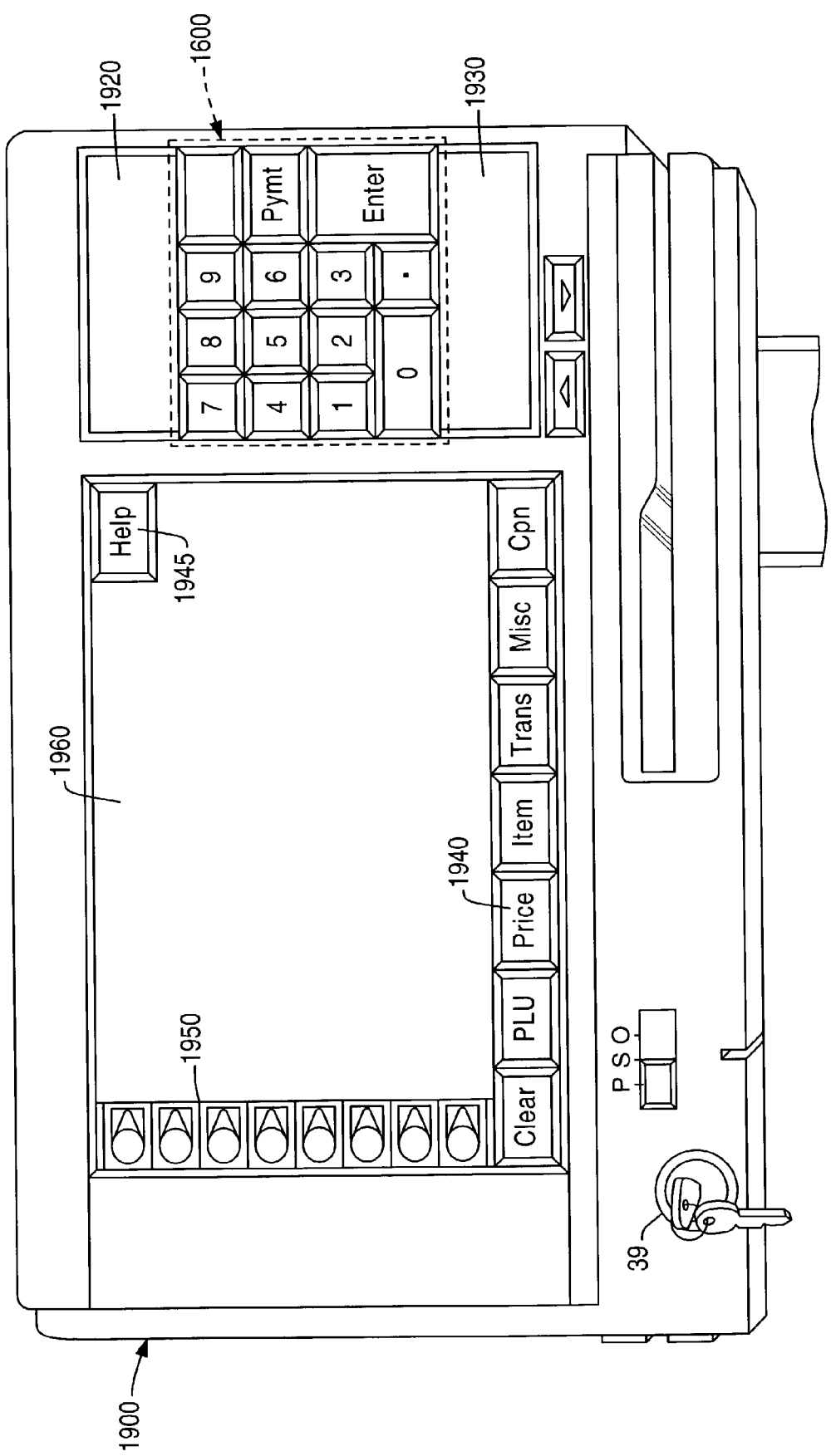
FIG. 19 is a view of another touch screen user interface system according to the present invention.

In another embodiment, it may be desired to move the functions of non-numeric key module 1420 of FIG. 14 from touch screen 1340 to touch screen 1320. FIG. 19 shows an exemplary embodiment of such a touch screen user interface system 1900. In this embodiment, keypad module 1600 of FIG. 16 has been installed over touch screen 1340 of FIG. 13 between dotted lines 1342 and 1344. The remaining portions 1346 and 1348 of touch screen 1340 shown in FIG. 13 have been covered by cover plates 1920 and 1930. These cover plates may serve desirable purposes including furtherance of aesthetic appeal, system integrity and security, and avoidance of erroneous touch screen signals.

As further shown in FIG. 19, seven function keys corresponding to the non-numeric key module 1420 shown in FIG. 14 have been integrated into a longitudinal key module 1940 similar to module 1700 shown in FIG. 17, and installed over touch screen 1320 of FIG. 13 between dotted line 1350 and bottom edge 1351 of touch screen 1320. There are eight defined function keys and one undefined key in non-numeric key module 1420 of FIG. 14, and only seven of them can fit across the bottom of touch screen 1320 of FIG. 13. Accordingly, the "Help" key 1945 shown in FIG. 19 has been selected for prominent isolated location over portion 1352 of touch screen 1320. The undefined key in non-numeric key module 1420 of FIG. 14 has been omitted in this embodiment. Instead, touch screen user interface system 1900 of FIG. 19 has further been provided with a dynamic key module 1950 like module 700 shown in FIGS. 7 and 8, installed between dotted line 1354 and left edge 1355 of touch screen 1320 shown in FIG. 13.

Dynamic or static key modules in the forms, for example, depicted in FIGS. 7-10 and 14-17, can be installed in a variety of desired arrangements into touch screen user interface system 1300 of FIG. 13. In one embodiment, a default selection of dynamic or static key modules is installed in a default configuration over the touch screens 1320 and 1340. In another embodiment, the system operator or the end-user may select a desired array of dynamic or static key modules to be installed over the touch screens 1320 and 1340. This latter embodiment readily facilitates a choice of key modules taking the end-user's personal needs and attributes into account. These attributes can include the end user's left- or right-handedness, finger and hand size and dexterity, preferred high-use and shortcut keys, preferred key sizes and shapes, preferred keyboard layout, color schemes, language, and handicaps, for example, impaired coordination, paralysis and other neurological disorders, and blindness. These systems readily permit, for example, a left-handed key operator to remove a right-handed key module at the beginning of his or her work shift, and replace it with a left-handed key module, optionally repositioned in a left-handed location on a touch screen. The present invention further facilitates a choice of key modules that is tailored to the special needs and priorities of a specific business or other type of application while allowing a manufacturer to achieve the efficiencies of scale of manufacturing a common base terminal.

Dynamic and static key modules can be installed over any chosen touch screen actuators of the touch screen or touch screens of a particular touch screen user interface system. In one exemplary embodiment, a touch screen is completely covered by static key modules. In another exemplary embodiment, a large unitary touch screen is configured with selected groupings of dynamic and static key modules as well as exposed and covered portions of such touch screen, yielding a user interface system having two, three, or even more regions presenting tactile keys and visible touch screen sectors displaying user-driven interface choices 44 as shown in FIG. 3 to the user.

The touch screen user interface shown in FIG. 6 itself resembles widely-commercialized systems. Some such systems may omit the mechanically-actuated keypad 610. In either case, the dynamic and static key modules of the present invention can be used to retrofit and upgrade the capabilities of such a conventional touch screen user interface system. The open flexibility of the tactile key modules of the present invention permits any conventional touch screen user interface system to be provided with desired additions of any desired dynamic and static keys in any locations on the touch screen.

Returning to FIG. 13, selected dynamic and static key modules are installed over touch screen 1320 or touch screen 1340 as desired. In one embodiment, adhesive 780 is provided on a contact surface 770 of key module 700 as illustrated in FIG. 8. The key module 700 is then positioned over touch screen actuator 755 of touch screen 750, and affixed in place by the adhesive. In another embodiment, adhesive 980 is provided on contact surface 970 of key module 900 as illustrated in FIG. 9. The key module 900 is then positioned over touch screen actuator 960 of touch screen 910, and affixed in place by the adhesive.

The present invention is not limited by the form of attachment to be used in placing tactile key modules in position over a touch screen. Among the considerations in choosing such an attachment are accuracy and security of placement, such factors being related to ensuring that the installed tactile key modules are precisely located where intended over the touch screen, and that they remain in position for the desired duration of use. Further considerations in choosing an attachment are ease of removal, preservation of the tactile key modules and touch screen surface during removal, and ease of reattachment elsewhere. Such factors are related to ensuring that the installed tactile key modules can be easily removed without being damaged and without damaging the touch screen, and that they can then easily be reattached to the same or a different touch screen if desired.

In embodiments where the primary goal is to provide a touch screen having customized tactile keys for a particular user or application, ease of removal and reattachment of tactile key modules may if desired be ignored in favor of maximized security and minimized cost of installation. In such cases, attachment of tactile key modules using strong permanent adhesive may be the optimum choice. In one related embodiment, an adhesive is selected that can later be softened by application of a solvent, optionally pre-selected, to facilitate later removal of tactile key modules from the touch screen. In embodiments where ease of rapid reconfiguration of a touch screen user interface system is paramount, tactile key modules and the perimeters, for example, 1356 and 1358 of touch screens 1320 and 1340 illustrated in FIG. 13 can be provided with complementary attachment mechanisms to facilitate affixation of dynamic or static key modules in place. Alternatively, for example, the edges 1360 and 1362 of the housing of touch screen user interface system 1300 adjacent to touch screens 1320 and 1340 can be provided with complementary attachment means to facilitate affixation of dynamic or static key modules in place. Complementary attachment means may be conventionally designed, and include, as non-limiting examples, clips, hooks, clasps, sliders, tapes, brackets, screws, Velcro® fasteners and equivalents, suction cups, magnetized elements, and complementary binding features molded into the modules and the housing.

As explained above in connection with FIG. 1, choice-driven interface application program 28 may be implemented to run in a Microsoft disk operating system (DOS) or Windows environment. An exemplary choice-driven interface application program is now discussed in connection with FIGS. 5 and 20-33. Then, the configuration system for the dynamic and static tactile key modules of the present invention will be discussed.

FIG. 11 is a touch screen user interface system having dynamic keys 702-716 installed over touch screen 1130. The following discussion relates principally to the exposed portion of touch screen 1130 with FIG. 20 showing displays adjacent individual keys of key module 700 and FIGS. 22-33 simply showing the key module 700 schematically as a block for ease of illustration.

With reference to FIG. 20, choice-driven interface application program 28 of FIG. 1 creates a graphic interface which divides LCD 18 into functional sections. Title and instruction section 50 in the upper left corner of LCD 18 displays the title of the overlay and any instructions. Prompt section 52 displays prompts for information. Echo section 54 is adjacent prompt section 52 and displays responses entered by an operator. List section 56 is in the lower left hand corner and is used to display lists of merchandise items entered through keypad 22 or scanner 29. List caption section 58 contains information about the number of items displayed in list section 56. Options section 59 occupies the entire right half of LCD 18 and displays user-driven interface choices 44 adjacent individual keys of key module 700.

Figure 21A:
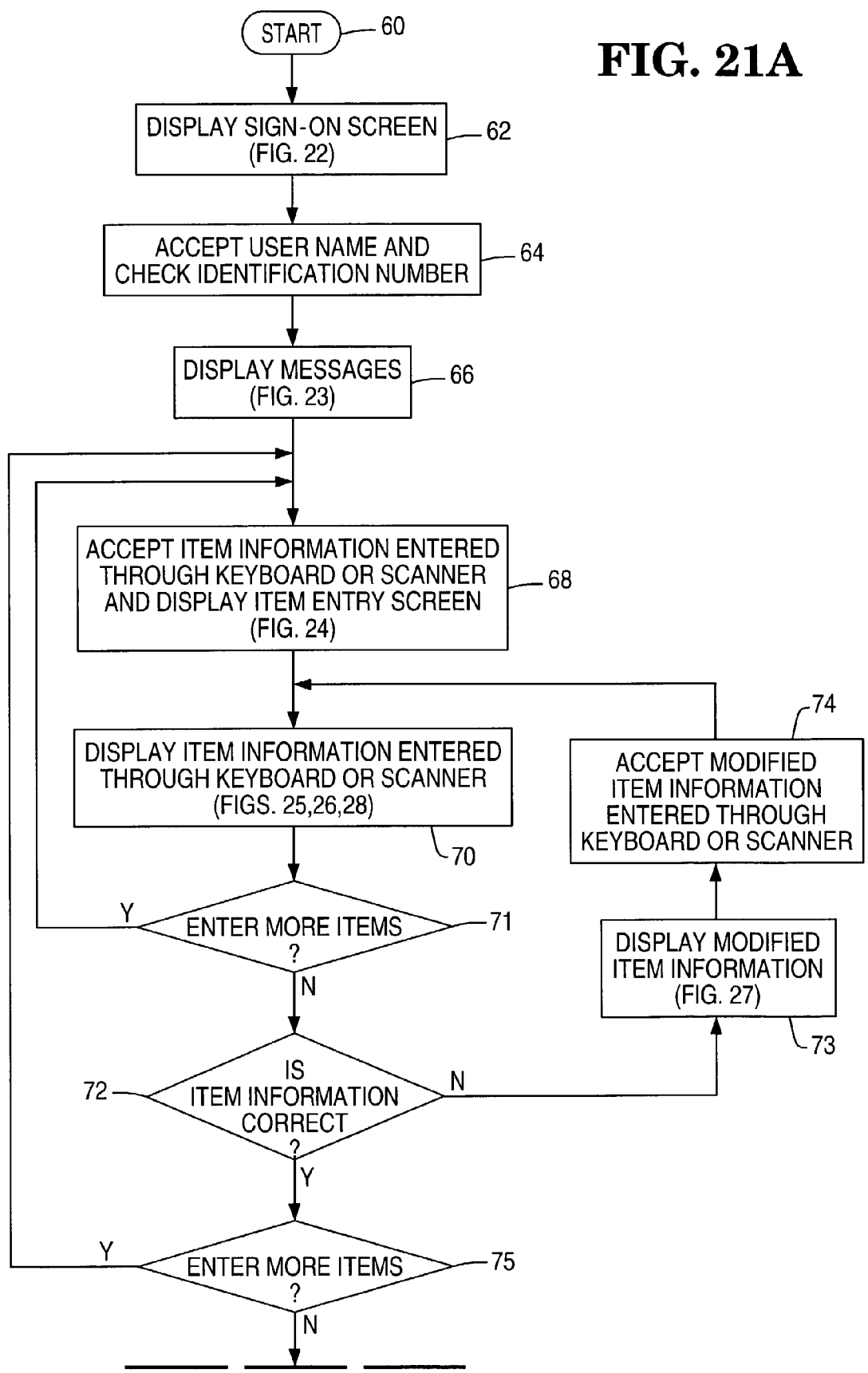

Referring now to FIGS. 21A and 21B, these figures together show a flow diagram illustrating a typical sequence of interface choices beginning with a START step 60. Each step follows the next and takes an operator through a specific sequence of overlays based upon the choice entered by the operator.

Figure 22:
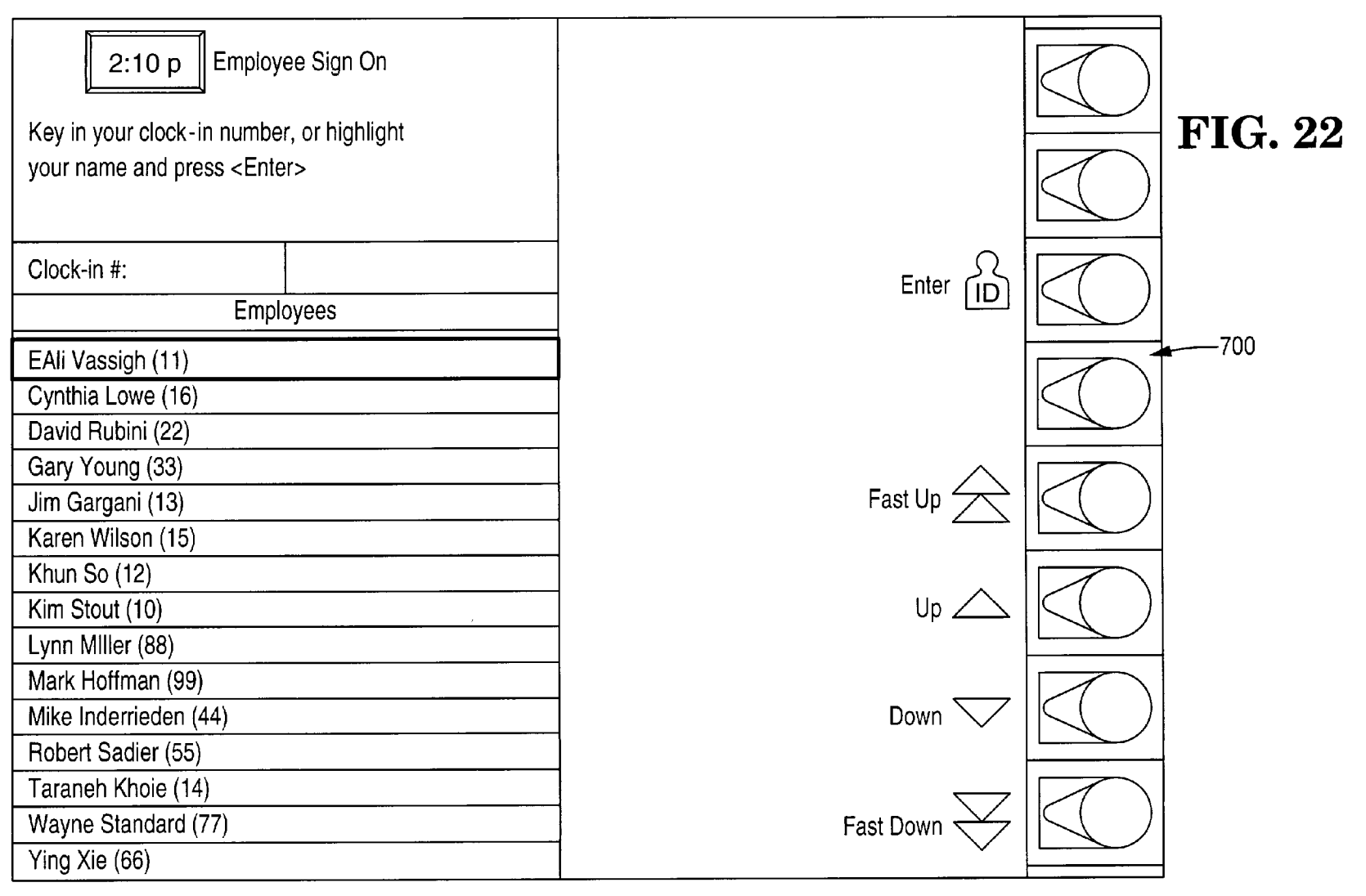

In step 62, choice-driven interface application program 28 displays a list of user names and an "Enter ID" choice on the right as illustrated in FIG. 22. Scroll up and down choices are also displayed. In step 64, choice-driven interface application program 28 accepts a proper name entered by the user from the list, a user identification number entered by the user, and checks the identification number, all after the user selects the "Enter ID" choice. Choice-driven interface application program 28 also records the time of day in order to keep an electronic record of the operator's working hours.

Figure 23:
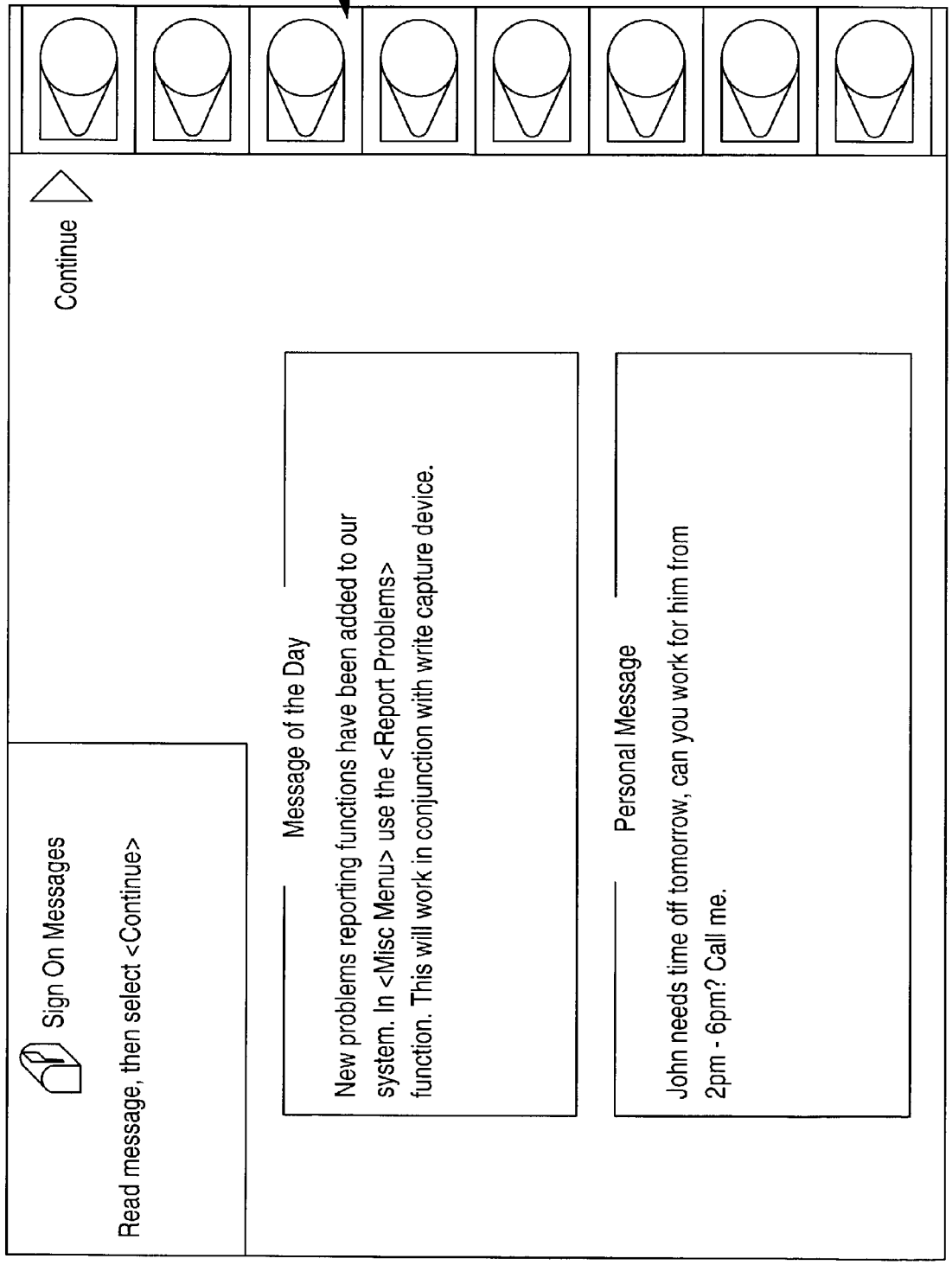

In step 66, choice-driven interface application program 28 displays broadcast and other messages of interest to the operator as illustrated in FIG. 23.

Figure 24:
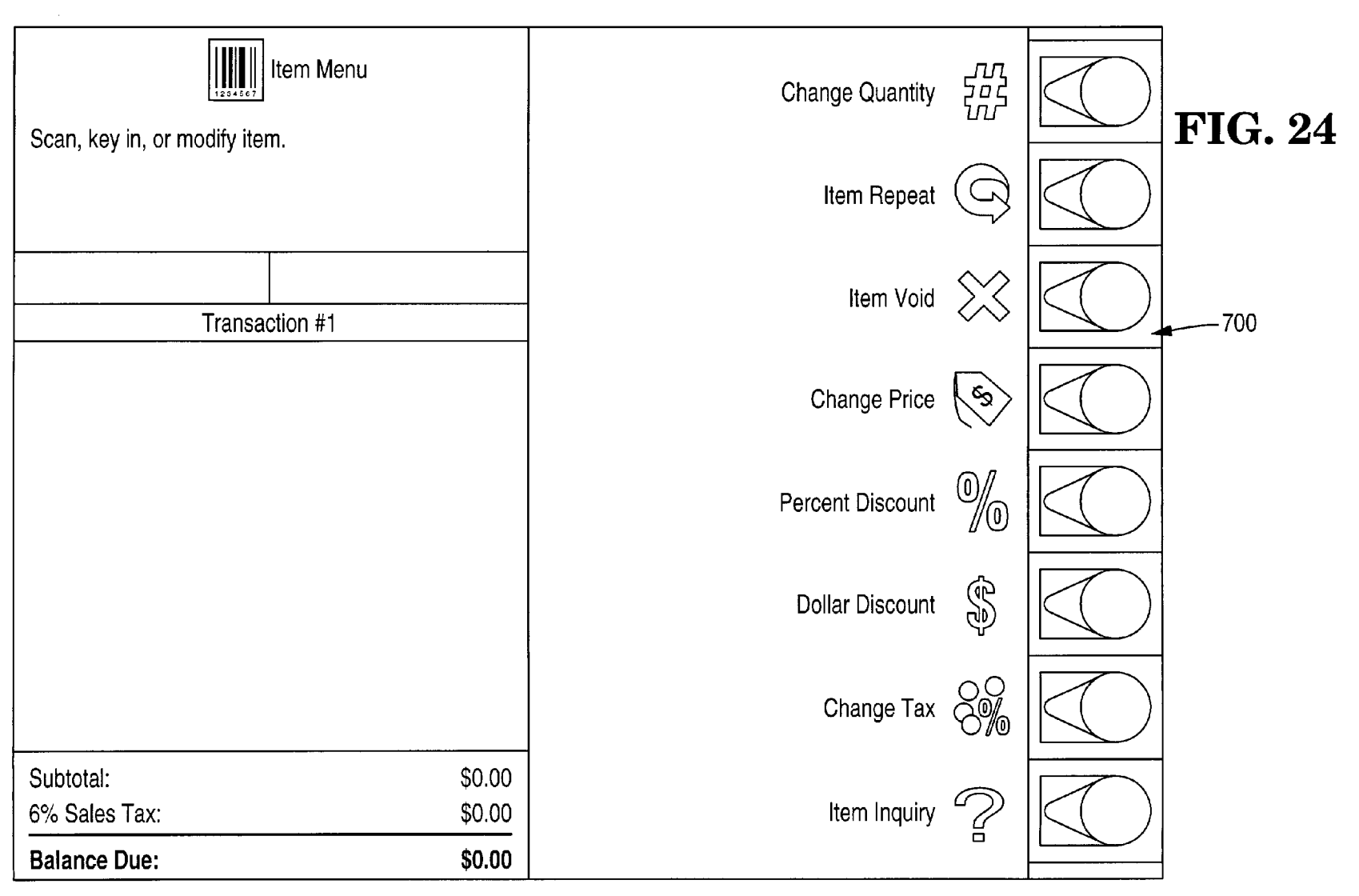

In step 68, choice-driven interface application program 28 displays an item entry overlay as seen in FIG. 24 and accepts item information, such as a price look-up number, entered through keypad 22 or scanner 29.

In step 70, as illustrated in FIG. 25, choice-driven interface application program 28 displays the item information entered in step 68. Choice-driven interface application program 28 offers choices along the right side to modify any item that has been entered. The choices include "Change Quantity", "Item Repeat", "Item Void", "Change Price", "Percent Discount," "Dollar Discount," "Change Tax", and "Item Inquiry" and are the choices 1131 shown in FIG. 11 as exemplary. The item to be modified may be chosen by moving cursor keys 48 and 49 shown in FIG. 2, or the corresponding cursor keys in FIGS. 6, 11-13, and 35.

In step 71, the choice-driven interface application program 28 determines whether more items are to be entered. If so, the choice-driven interface application program 28 loops back to step 68. If not, the choice-driven interface application program 28 proceeds to step 72. FIG. 26 illustrates the items entry overlay of FIG. 25 after a second item has been entered.

In step 72, choice-driven interface application program 28 determines whether a modification choice has been entered by a user. If so, it displays additional overlays in step 73, based upon the modification choice of the user. FIG. 27 illustrates the case in which a user selects the "Change Quantity" choice in FIG. 26 to change the number of blue jeans purchased. The "Change Quantity" choice produces further choices along the right side for likely numbers of blue jeans to be purchased, from 1 to 8. The number may also be entered manually using keypad 22. Other modification choices are made in a similar way.

The item modification process of step 72 illustrates the concept of multi-pathing, which is used throughout the choice-driven interface application program 28. An operator function may be performed in a plurality of different ways, using choice-driven interface actuators 20 and keypad 22. For example, item modification may be performed by engaging a number key within keypad 22, followed by the quantity choice-driven interface actuator shown in FIGS. 26 and 27. Alternatively, item modification may be performed by engaging the quantity choice-driven interface actuator, followed by the number choice-driven interface actuator. As a further alternative, item modification may be performed by engaging the quantity choice-driven interface actuator, followed by the number key within keypad 22, followed by the "Enter" key of keypad 22. Additionally, item modification may be performed by engaging the "Item Repeat" key a number of items equal to the number of items less one time.

Figure 28:
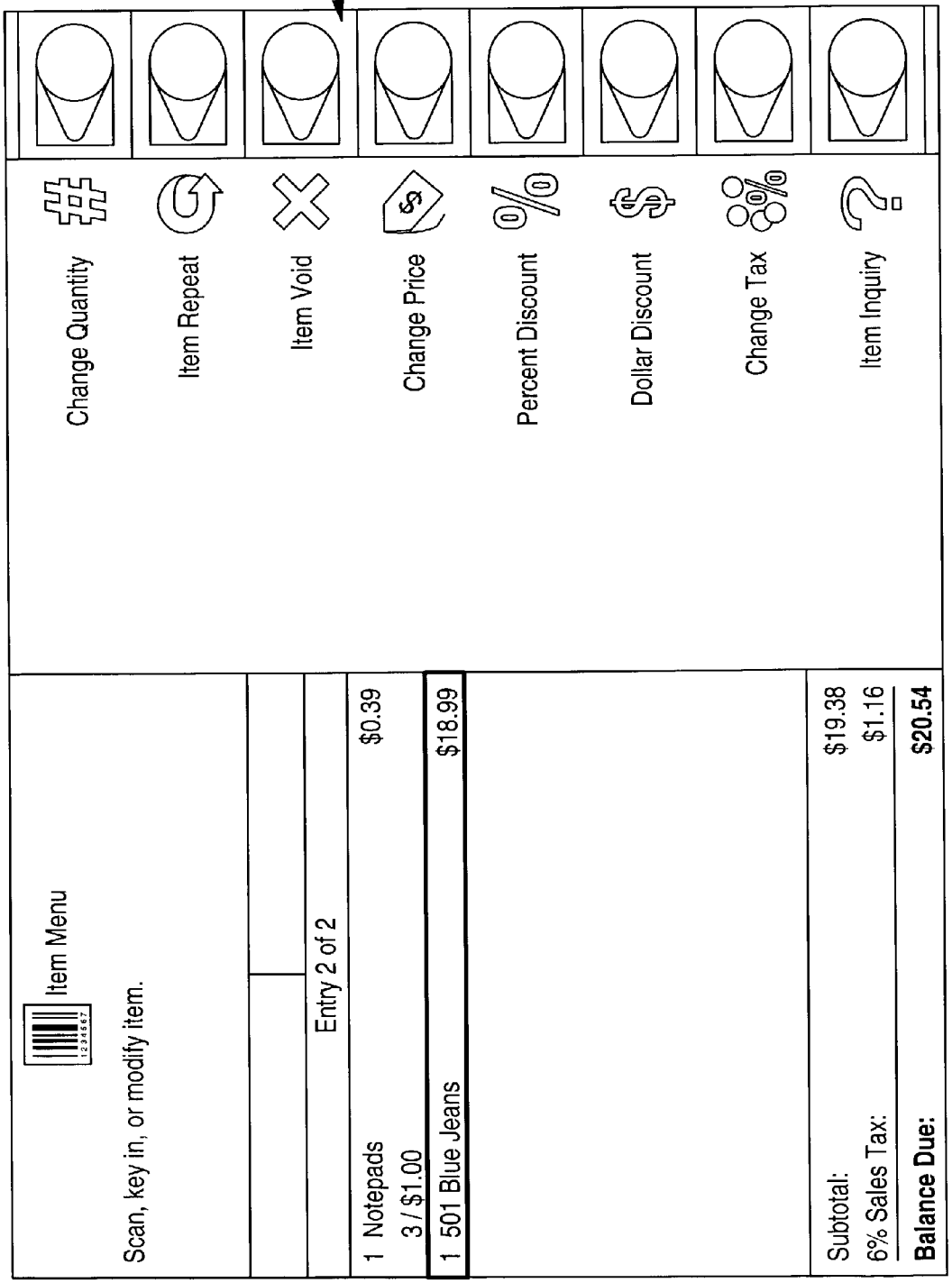

In step 74, choice-driven interface application program 28 accepts the modification by the user and returns to step 70 in which choice-driven interface application program 28 displays the item as modified. Here, the item entry overlay of FIG. 28 shows a new quantity of blue jeans.

After an item is modified, the choice-driven interface application program 28 returns to step 71, in which more items may be entered. Alternatively, the choice-driven interface application program 28 may proceed again to step 72 for further modifications. If there are no further modifications necessary, the choice-driven interface application program 28 proceeds to step 75 for more item entries. If there are no further item entries or modifications, the choice-driven interface application program 28 proceeds to the payment process, beginning with step 76.

In step 76, choice-driven interface application program 28 displays predetermined payment options as illustrated in FIG. 5. Here, the options include "Cash", "Personal Checks", "Smart Card", "Credit Card", "Food Stamp", "Gift Certificate", "Traveler's Check", or "Other Payments."

In step 78, the choice-driven interface application program 28 is simplified to reflect only the choices of "Cash" and "Credit Card". Thus, the choice-driven interface application program 28 determines whether the payment option is cash. If so, the choice-driven interface application program 28 proceeds to step 80 in which choice-driven interface application program 28 displays predetermined payment options and accepts a choice entry by the operator based upon a choice by the customer as illustrated in FIG. 29. The payment choices for cash include exact change and additional combinations of paper currency that exceed the total price. The user may also manually enter the paid amount using keypad 22.

Figure 30:
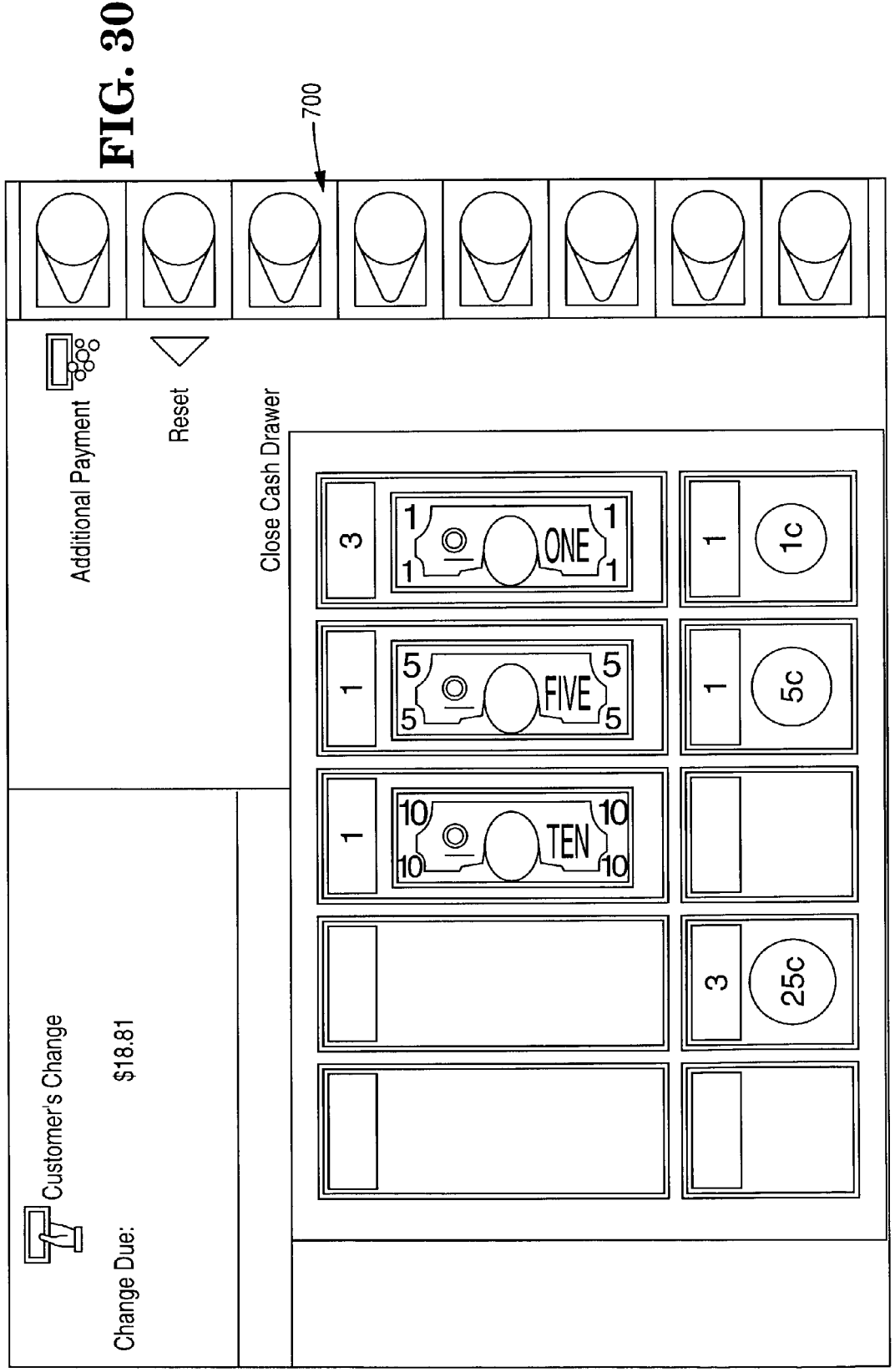

In step 82, choice-driven interface application program 28 determines whether any choice other than the exact change choice has been entered by the employee. If so, choice-driven interface application program 28 displays the correct change in terms of paper currency and coins in step 84 as seen in FIG. 30. Advantageously, choice-driven interface application program 28 reduces the chance of employee error in calculating change.

Referring back to step 82, if the exact change choice is entered by the employee, then the choice-driven interface application program 28 terminates at end step 86.

Figure 31:
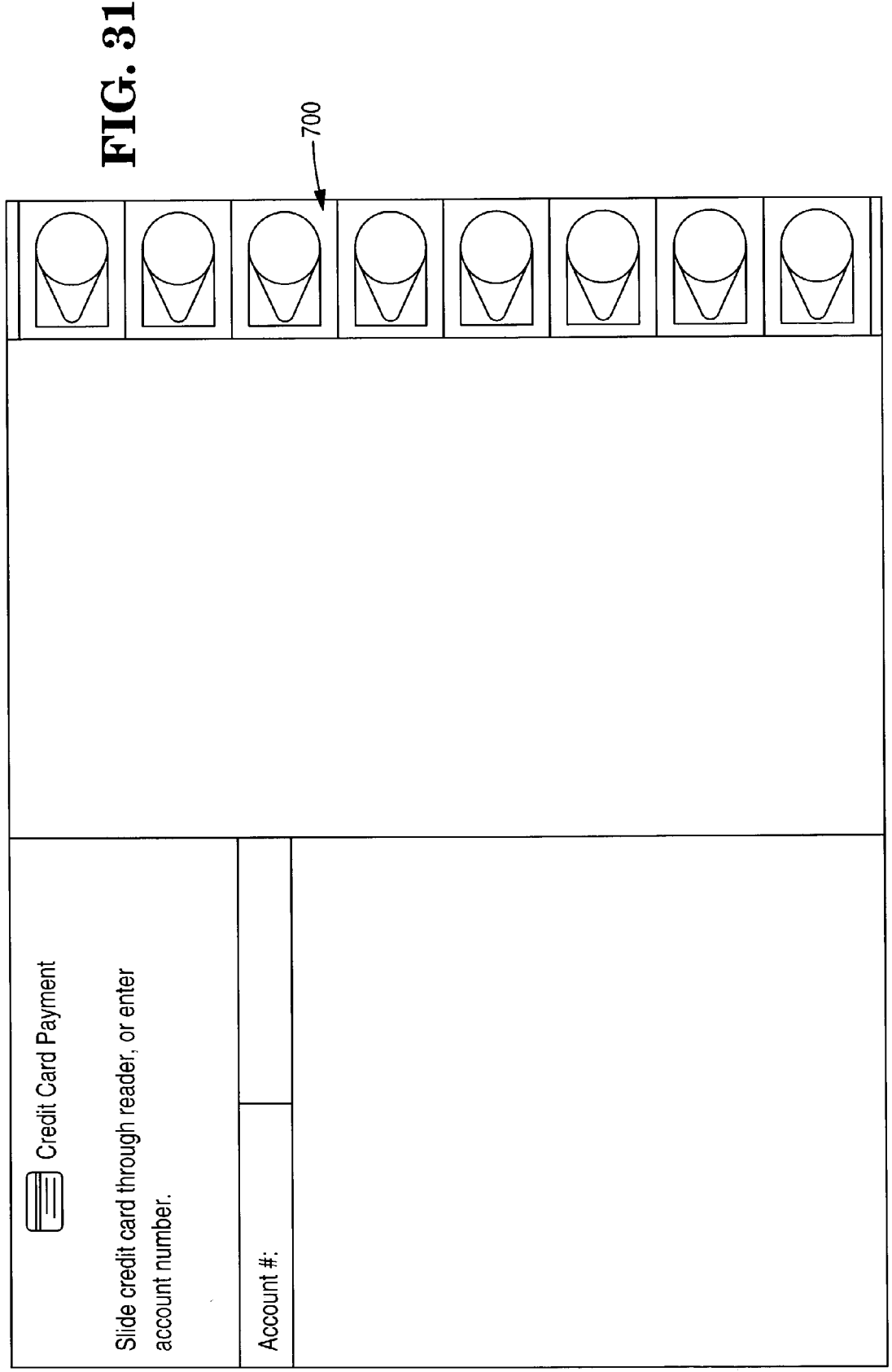

Referring back to step 78, if the payment choice was credit card, then choice-driven interface application program 28 displays an overlay as seen in FIG. 31 for instructing an operator to enter an account number from the credit card in step 79.

Figure 32:

In step 81, choice-driven interface application program 28 displays an overlay as seen in FIG. 32 instructing the operator to verify a signature recorded by signature capture device 23.

Figure 33:
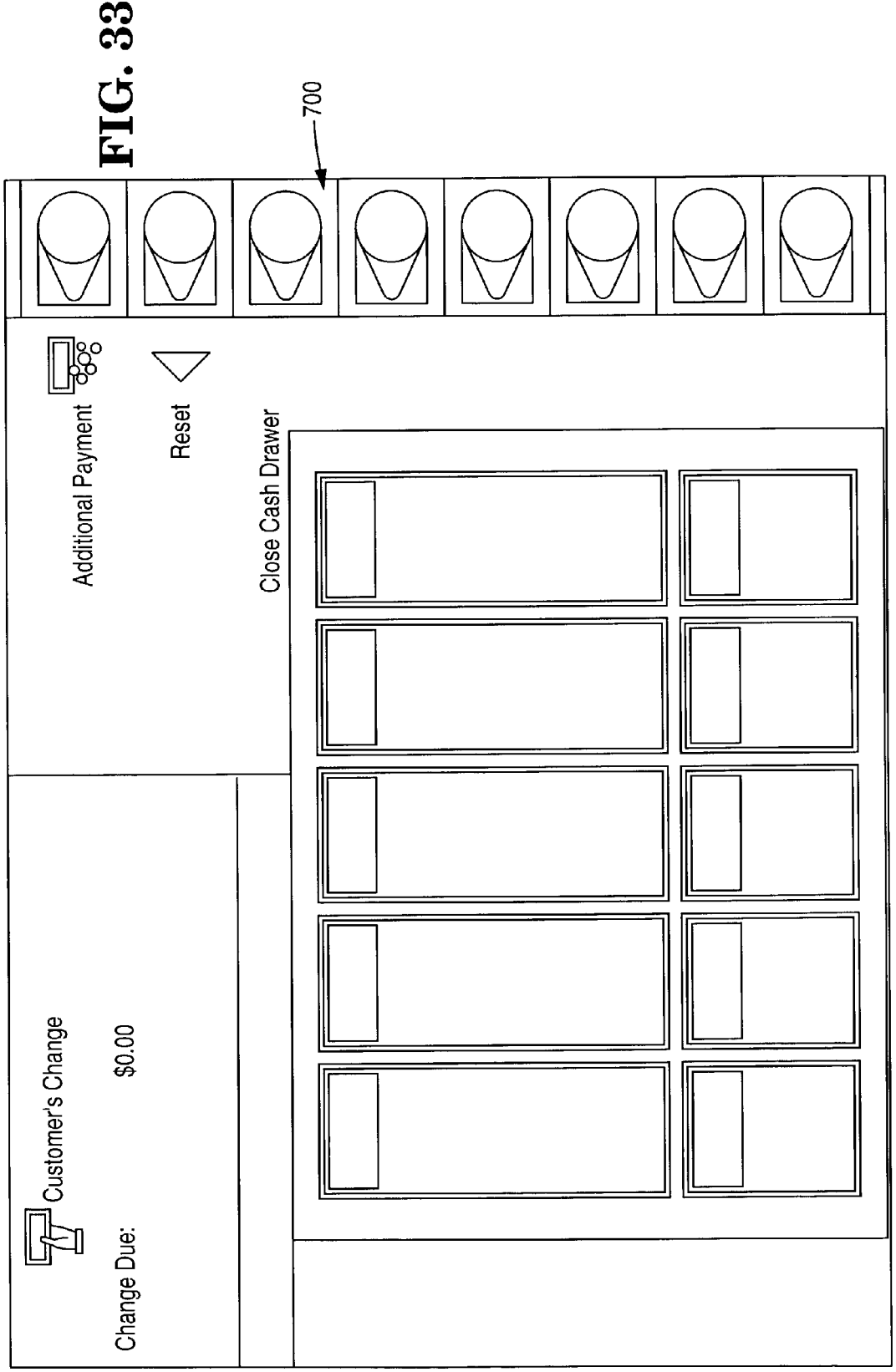

In step 84, choice-driven interface application program 28 displays a cash drawer indicating that no change is due as seen in FIG. 33, and then terminates at end step 86.

Referring to the above discussion of FIG. 19, static key module 1940 and dynamic key module 1950 have been secured to the touch screen 1960, but the keys have not been individually linked to choice-driven interface application program 28 shown in FIG. 1 and therefore are not yet operable. Accordingly, the exemplary choice-driven interface application program 28 of FIG. 1 is augmented in practice of the present invention by a configuration program for dynamic and static module tactile keys.

The configuration program is written to be mutually compatible with the processor's operating system and the choice-driven interface application program 28 of the touch screen user interface system 10. The choice-driven interface application program 28 itself includes the executable code required to carry out the functions of all intended dynamic and static tactile keys. The touch screen overlaying LCD 18 is implemented with additional software linked to the choice-driven interface application program 28. However, the necessary linkages between the choice-driven interface application program 28 and each intended dynamic and static tactile key have not yet been established. The purpose of the configuration program is to create such linkages via the touch screen.

Figure 34:
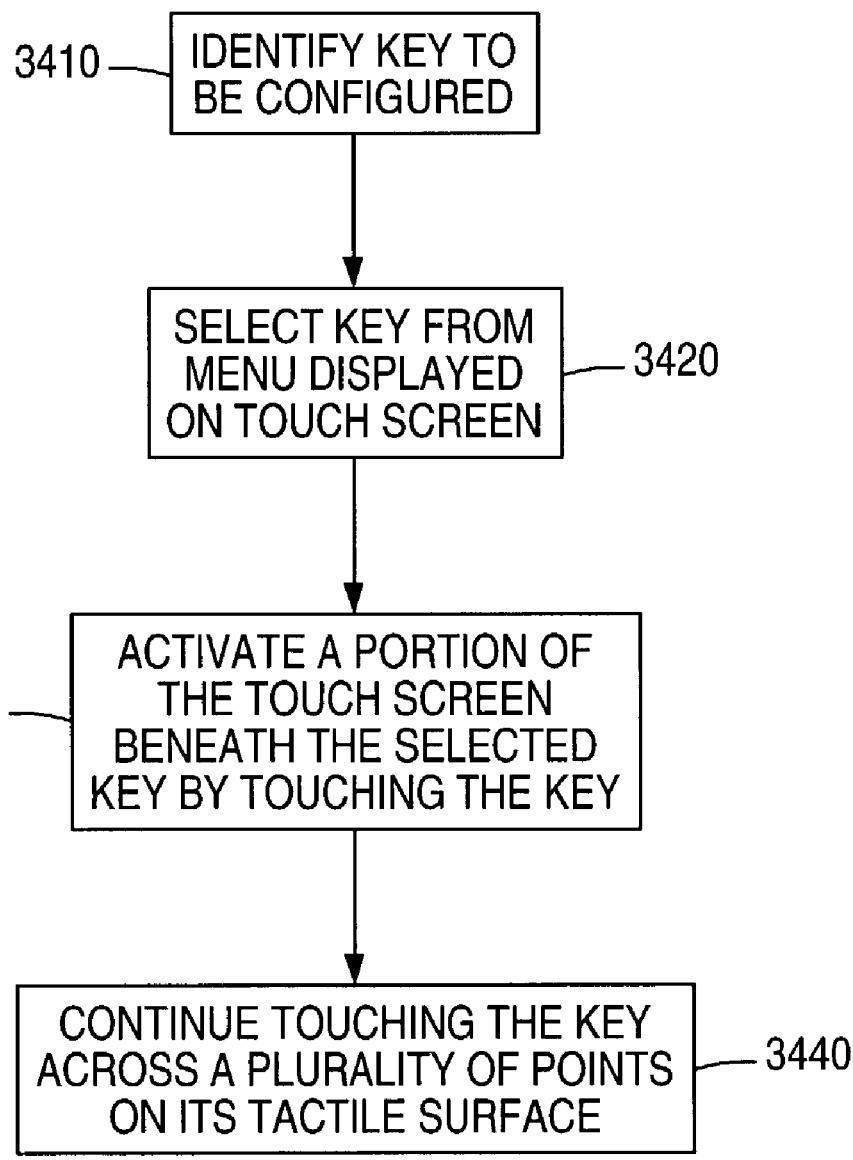
FIG. 34 is a configuration process flowchart for use in conjunction with the present invention.
Figure 35:
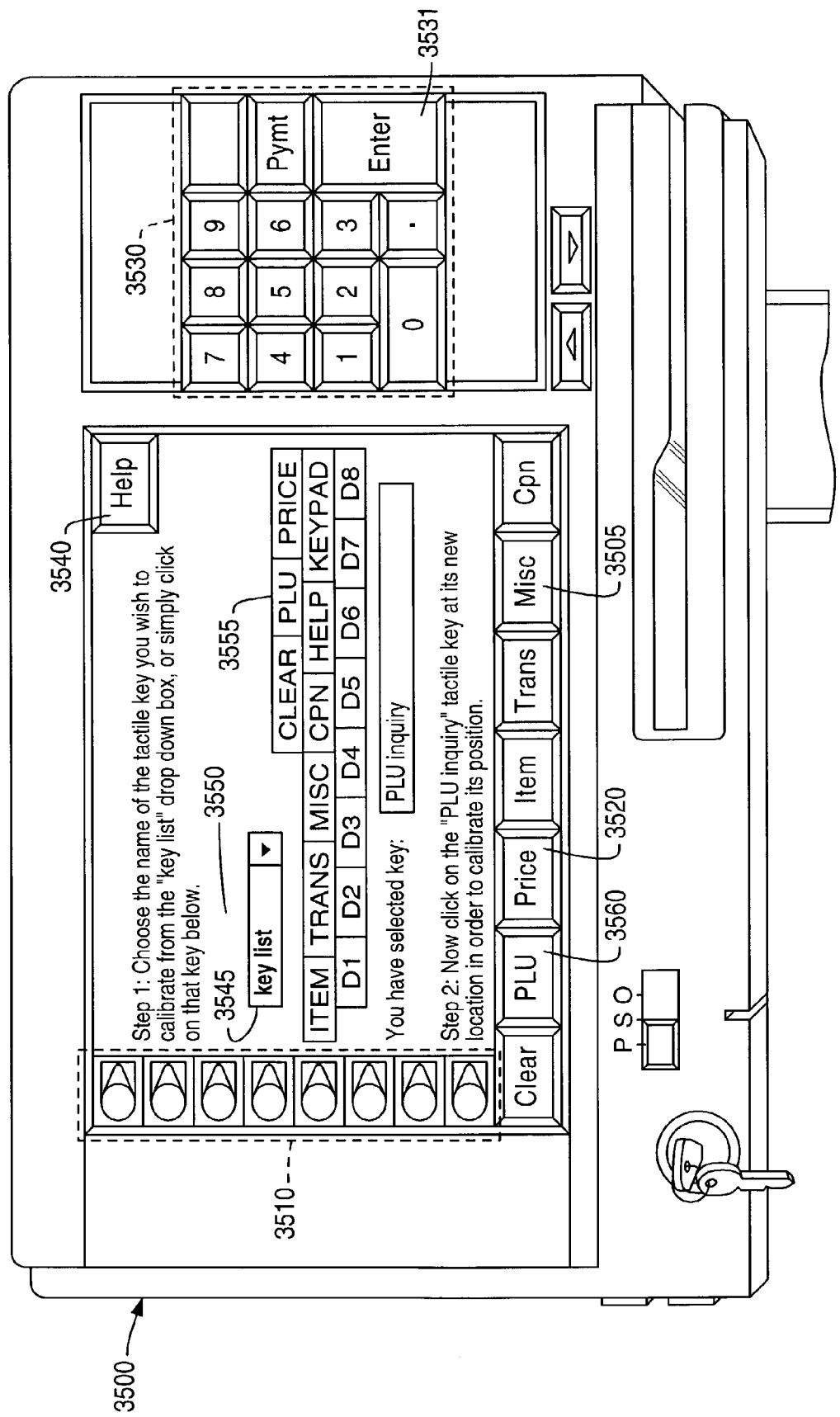
FIG. 35 is a view of another touch screen user interface system according to the present invention displaying a configuration choice-driven interface.

FIGS. 34 and 35 illustrate an exemplary configuration process 3400. FIG. 35 shows touch screen user interface system 3500, which is the same system as shown in FIG. 19 after the key operator has selected "Misc" key 3505 and placed the system into configuration mode. In step 3410, the system operator identifies a key to be configured. This key can be any of the eight dynamic keys 3510, the seven static keys 3520, the keypad 3530, or static key 3540, all shown in FIG. 35. While configuration is discussed herein in the context of these specific keys, it will be recognized that the teachings of the present invention can be readily adapted to the configuration of any desired keys for a particular application.

In step 3420, the key operator selects the identified key from a menu displayed on the touch screen. For example, the key operator can select the key either by scrolling to its label name from the "key list" drop down box 3545 displayed on the touch screen 3550, or by clicking on an image 3555 of the key also displayed on touch screen 3550.

In step 3430, the key operator establishes the necessary linkage between the choice-driven interface application program 28 and the selected key. This linkage can be established by touching the tactile surface of the actual key in the key module. The software implementing the touch screen senses the location of the key activity on the touch screen and maps that location of touch screen activity to the choice-driven interface application program 28, and the configuration software identifies the key function as that selected by the key operator. For example, in FIG. 35, the key operator has selected the "PLU Inquiry" key from the key list drop down menu 3545. The key operator then touches the actual PLU key 3560, activating a touch screen actuator underneath key module 3520. The software implementing the touch screen senses the location of the key activity on the touch screen 3550 and maps that location of touch screen activity to the choice-driven interface application program 28. The configuration software identifies the key function as being "PLU Inquiry," and the choice-driven interface application 28 stores an identification file for "PLU Inquiry" linked to touch screen activity from the actual key 3560.

The process shown in FIG. 34 can then be repeated for the balance of the dynamic and static keys shown in FIG. 35. In this embodiment, icons "D1" through "D8" respectively correspond to the dynamic keys 3510 arranged on the lefthand side of the touch screen user interface system 3500. The keypad 3530 can be configured as a unit, provided that the choice-driven interface application program stores the keyboard layout linked to a keyboard model number code in memory. Alternatively, its keys can be individually configured in the same manner as are the other keys.

Undesignated static keys can similarly be configured. For example, referring to FIG. 14, each of undesignated static keys 1450 and 1460 can be mapped to a chosen function, and then provided with a fixed function label.

For relatively large keys, such as the "enter" key 3531, the exact location engaged on touch screen 3550 by touching the key may vary, particularly where the signal transfer unit can engage a greater than minimal portion of the touch screen. In such cases, optional step 3440 shown in FIG. 34 can be executed. To ensure robust calibration of such a key, the calibration software can thus be enabled to request the key operator to depress the key from a variety of angles so that the entire contact footprint of the signal transfer unit is captured and integrated into the identification file in the choice-driven interface application for that key. If desired, the level of tactile force required to activate the key being depressed can either be programmed into the calibration software, or measured by the system operator's actual, individual tactile key entry.

The software utilized to program the operating system for the touch screen may be independent of the end user application, POS for example, and is available from many sources under different names. One such object-oriented software product for use in retail sales applications is the Advanced Store User Interface (ASUI). ASUI is easily incorporated into a Microsoft® Visual C++™ dialog-based program, and utilizes four common pre-defined retail screen design forms.

Although the exemplary embodiments of the present invention have been described above by application to the illustrated touch screen user interface systems, the present invention can generally be applied to any touch screen user interface system. For example, the present invention can be implemented to retrofit and thereby upgrade the capabilities of any touch screen user interface system by the addition of dynamic or static tactile key modules or a combination of dynamic and static key modules, provided that calibration software compatible with the operating system for such touch screen user interface systems is installed.

The touch screen user interface systems of the present invention can be employed in a wide range of applications. In retail sales, computer systems, and business office fields, robust POS terminals for internal system operator and self-service use can be configured for any desired specific business, such as a product or service line. The touch screen user interface systems of the present invention are particularly useful in retail sales, computer systems, and business office fields, because the need is high in such applications for ongoing and potentially user-executed reconfiguration of the keys, as well as for configurations tailored not only to particular applications, but to the attributes and preferences of specific users as well.

In one further example, it is envisioned that a laptop computer can be produced with an integrated touch screen instead of an integrated keyboard, and the manufacturer or user can then select, install and configure a keyboard module reflecting the user's personal and business application attributes. In the industrial and machinery fields, dedicated systems can be designed for operation of instrument panels and other control systems for machinery, vehicles, warehouses, factories, and refineries. In the field of electronic devices, interactive controls can be designed for operation of telecommunication units such as cellular telephones and personal data assistants, appliances, tools and detectors. A multitude of further applications can also be envisioned.

While the present invention has been disclosed in a variety of presently preferred contexts, it will be recognized that the present teachings may be further adapted to other contexts consistent with this disclosure and the claims that follow.

I claim:

1. A user interface system for inputting information, comprising:
   a touch screen;
   a tactile key mechanism placed adjacent to a first touch screen actuator within said touch screen, the key mechanism including a housing and a key moveable relative to the housing having a tactile surface, the key mechanism including components responding to a keypress of the key by acting on the first touch screen actuator so as to cause detection of a touch by the first touch screen actuator, the key mechanism further including components responding to a keypress of the key resulting in detection of a touch by the first touch screen actuator so as to produce a tactile feedback to a user indicating that the keypress has been sufficient to produce a successful detection of a touch by the first touch screen actuator; and
   a choice-driven interface application program controlling displays on the touch screen of a specific sequence of overlays based on choices entered by an operator.

2. The user interface system of claim 1, in which a function of said tactile key is mapped through said first touch screen actuator to a program for execution of said function.

3. The user interface system of claim 1, in which a function of said tactile key is displayed by said touch screen.

4. The user interface system of claim 1, in which said tactile key is secured in position adjacent to said first touch screen actuator.

5. The user interface system of claim 1, wherein the tactile key includes a signal transfer unit providing a signal detectable by the touch screen actuator when the tactile surface of the tactile key is manipulated by a user.

6. The user interface system of claim 5, wherein the signal provided by the signal transfer unit is an optical signal.

7. The user interface system of claim 6, wherein manipulation of the tactile surface of the tactile key causes a change in a level of light impacting on a localized area of the touch screen.

8. The user interface system of claim 5, wherein the signal provided by the signal transfer unit is a mechanical signal.

9. The user interface system of claim 8, wherein the signal transfer unit generates an acoustic wave at the touch screen actuator upon manipulation of the tactile surface of the tactile key by a user.

10. The user interface system of claim 9, wherein manipulation of the tactile surface of the tactile key causes movement of a contact tip into physical contact with the touch screen actuator.

11. The user interface system of claim 9, wherein manipulation of the tactile surface of the tactile key causes projection of an acoustic wave in the direction of the touch screen actuator.

12. The user interface system of claim 5, wherein the signal provided by the signal transfer unit is an electrical signal.

13. A method of utilizing a user interface system for inputting information comprising a touch screen and a tactile key mechanism including a key having a tactile surface within a tactile key housing, comprising the steps of:
    placing said tactile key housing adjacent to a first touch screen actuator within said touch screen, such that a keypress of the key results in movement of the key relative to the tactile key housing and a response by components of the key mechanism detected as a touch by the first touch screen actuator, a keypress of the key sufficient to result in detection of a touch by the touch screen actuator further resulting in a tactile feedback by the key mechanism indicating that the keypress has been sufficient to produce successful detection of a touch by the first touch screen actuator; and
    controlling the touch screen utilizing a choice-driven interface application program to display a specific sequence of overlays based on choices entered by an operator.

14. The method of claim 13, comprising the step of mapping a function of said tactile key through said first touch screen actuator to a program for execution of said function.

15. The method of claim 13, comprising the step of securing said tactile key in position adjacent to said first touch screen actuator.

* * * * *